US011068515B2

(12) United States Patent
 Bukowski

(10) Patent No.: US 11,068,515 B2
(45) Date of Patent: Jul. 20, 2021

(54) MAP UNCERTAINTY AND OBSERVATION MODELING

(71) Applicant: Google LLC, Mountain View, CA (US)

(72) Inventor: Richard William Bukowski, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/626,445

(22) PCT Filed: Jul. 23, 2019

(86) PCT No.: PCT/US2019/043009
§ 371 (c)(1),
(2) Date: Dec. 24, 2019

(87) PCT Pub. No.: WO2020/023495
PCT Pub. Date: Jan. 30, 2020

(65) Prior Publication Data
US 2021/0133218 A1   May 6, 2021

Related U.S. Application Data

(60) Provisional application No. 62/702,570, filed on Jul. 24, 2018.

(51) Int. Cl.
*G06F 16/29*   (2019.01)
*G06F 16/23*   (2019.01)
(Continued)

(52) U.S. Cl.
CPC ............ *G06F 16/29* (2019.01); *G06F 16/212* (2019.01); *G06F 16/2365* (2019.01); *G06F 16/288* (2019.01)

(58) Field of Classification Search
CPC .... G06F 16/29; G06F 16/2365; G06F 16/288; G06F 16/212
(Continued)

(56) References Cited

U.S. PATENT DOCUMENTS

2016/0179841 A1\* 6/2016 Ford ................... G01C 21/387
                                                              701/532
2017/0254665 A1   6/2017 Bai et al.
(Continued)

FOREIGN PATENT DOCUMENTS

CN         101952688         1/2011
CN         107228676         10/2017
(Continued)

OTHER PUBLICATIONS

International Search Report and Written Opinion for PCT/US2019/043009 dated Oct. 24, 2019, 11 pages.
(Continued)

*Primary Examiner* — James Trujillo
*Assistant Examiner* — Fariborz Khoshnoodi
(74) *Attorney, Agent, or Firm* — Dority & Manning, P.A.

(57) ABSTRACT

Systems and methods are described that provide measures of uncertainty for map features provided in association with a vehicle map service. A vehicle map service may include a vehicle map model that is configured to provide map data for a geographic area in association with a vehicle map service. The vehicle map model can have an entity schema that includes a first address space configured to represent a plurality of entities associated with the vehicle map model. The vehicle may service may include an uncertainty model that is configured to represent a plurality of uncertainties associated with the plurality of entities. The uncertainty model can have an uncertainty schema that includes a second address space that is separate from the first address space. Uncertainties in the second address space can point to one or more entities in the first address space.

20 Claims, 16 Drawing Sheets

(51) Int. Cl.
  *G06F 16/28* (2019.01)
  *G06F 16/21* (2019.01)
(58) Field of Classification Search
  USPC .......................................................... 707/690
  See application file for complete search history.

(56) References Cited

U.S. PATENT DOCUMENTS

| 2017/0277716 | A1  | 9/2017  | Giurgiu et al. |            |
|--------------|-----|---------|----------------|------------|
| 2018/0127001 | A1* | 5/2018  | Ricci          | B60W 40/09 |
| 2018/0203443 | A1* | 7/2018  | Newman         | B60L 1/00  |
| 2019/0051153 | A1* | 2/2019  | Giurgiu        | G01C 21/3811 |
| 2020/0409374 | A1* | 12/2020 | Dong           | G06K 9/00  |

FOREIGN PATENT DOCUMENTS

| CN | 107850453 | 3/2018 |
|----|-----------|--------|
| EP | 2721374   | 8/2016 |

OTHER PUBLICATIONS

McKenzie et al, "Assessing the Effectiveness of Different Visualizations for Judgments of Positional Uncertainty", International Journal of Geographical Information Science, Aug. 10, 2015, 19 pages.
International Preliminary Report on Patentability for Application No. PCT/US2019/043009, dated Feb. 4, 2021, 7 pages.
McKenzie et al., "Assessing the Effectiveness of Different Visualizations for Judgments of Positional Uncertainty", International Journal of Geographical Information Science, vol. 30, No. 2, Sep. 12, 2015, pp. 221-239.

* cited by examiner

MAP UNCERTAINTY AND OBSERVATION MODELING

PRIORITY CLAIM

This application is based upon and claims the right of priority under 35 U.S.C. § 371 to International Application No. PCT/US2019/043009 filed on Jul. 23, 2019, which claims the right of priority to U.S. Provisional Application No. 62/702,570, filed on Jul. 24, 2018 Applicant claims priority to and the benefit of each of such applications and incorporates all such applications herein by reference in their entirety.

FIELD

The present disclosure relates generally to a system for accessing and processing data including data associated with a vehicle map service.

BACKGROUND

Operations associated with geographic information can be implemented on a variety of computing devices. These operations can include processing the geographic information for access and use by a user or computing system. Further, the operations can include sending and receiving data to remote computing systems. However, the types of operations and the way in which the operations are performed can change over time, as can the underlying hardware that implements the operations. Accordingly, there are different ways to leverage computing resources associated with geographic information.

SUMMARY

Aspects and advantages of embodiments of the present disclosure will be set forth in part in the following description, or may be learned from the description, or may be learned through practice of the embodiments.

One example aspect of the present disclosure is directed to a computing system including a one or more non-transitory computer-readable media that collectively store a vehicle map model configured to provide map data for a geographic area in association with a vehicle map service and an uncertainty model configured to represent a plurality of uncertainties associated with the plurality of entities. The vehicle map model has an entity schema comprising a first address space configured to represent a plurality of entities associated with the vehicle map model. The uncertainty model has an uncertainty schema comprising a second address space that is separate from the first address space. At least one of the plurality of uncertainties in the second address space is configured to point to one or more of the plurality of entities in the first address space.

Another example aspect of the present disclosure is directed to a computer-implemented method of operating a vehicle map service. The method comprises accessing, by one or more computing devices, a map model configured to provide map data for a geographic area in association with a mapping service. The map model comprises a first address space configured to represent entities associated with the map model. The method comprises accessing, by the one or more computing devices, an uncertainty model configured to represent a plurality of uncertainties associated with the map data for the geographic area. The uncertainty model comprises a second address space that is separate from the first address space. The method comprises generating, by the one or more computing devices, map data comprising information associated with a geographic area. Generating the map data comprises generating, based at least in part on the map model, a plurality of entities defined in the first address space according to an entity schema of the map model, and generating, based at least in part on the uncertainty model, one or more uncertainty relations with respect to one or more of the plurality of entities. The one or more uncertainty relations are defined in the second address space according to an uncertainty schema of the uncertainty model.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for providing map data and uncertainty data.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
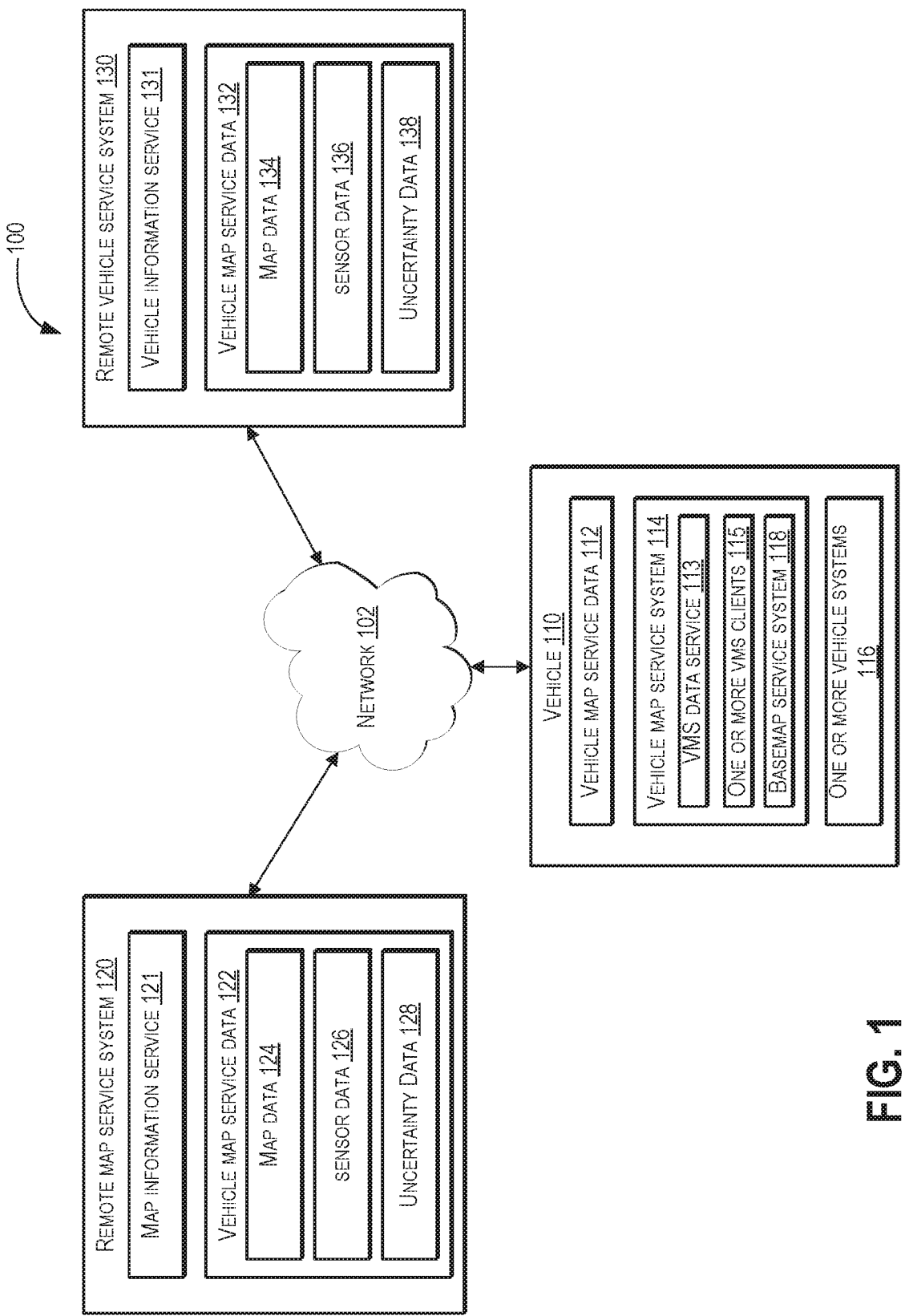
FIG. 1 depicts a block diagram of an example computing environment in which a vehicle map service in accordance with example embodiments of the present disclosure may be implemented.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, systems and methods in accordance with example embodiments of the present disclosure are directed to observation and uncertainty modeling for maps, such as digital maps that may be provided by a geographic information service. More particularly, an uncertainty model can be provided as part of a vehicle map service that is configured to transfer map and related data between client systems of a vehicle, as well as between client systems and remote geographic information systems and/or remote vehicle service systems. The uncertainty model can be configured separately and independently from an underlying map model of the vehicle map service. For example, the uncertainty model can define an uncertainty address space that is separate from an entity address space defined by the map model. In this manner, uncertainty relations defined using an uncertainty schema of the uncertainty model can point to entities defined using an entity schema of the map model, and can relate entities within the entity address space. Such a technique can support fusing multiple potentially incomplete, fractional maps and/or raw observations of map elements into a single comprehensive map. The uncertainty model can provide sufficient confidence and error information such that statistical inferences and combinations can be made in order to both represent fractional maps, such as those that may come from sensors of a vehicle, and provide the ability to meaningfully fuse fractional maps.

In accordance with example embodiments of the present disclosure, a vehicle map service can provide a model of the real-world from the perspective of multiple entities. For example, the model may include data or observations provided by sensors, map models, fused observations, etc. The entities associated with the vehicle map service may include sensors, map models, as well as observations inferred from the outputs of the sensors and/or map models. Examples of entities associated with a vehicle map service may include observations (e.g., signs, lanes, other vehicles, pedestrians, buildings, etc.), map features (also referred to as map elements), a vehicle from which map data is obtained or to which map data provided, or any other entity that may be associated with or represented by the vehicle map service. The vehicle map service can provide a local in-vehicle service that enables communication of map data and sensor-derived map-relative observations around the vehicle. Nearby map data can enable vehicles to understand more about their surroundings in order to drive more safely, efficiently, comfortably, and intelligently. In some examples, a data communication protocol can be defined for data communications between various systems. An in-vehicle navigation experience can enable drivers to search for and select destinations, select an optimal route, and navigate to a destination. Back-end cloud support can be provided to aid in analysis of vehicle data and planning. For example, the vehicle map service can provide in-vehicle services, including a live data service that can be implemented within one or more computing devices of a vehicle. The data service can be capable of downloading map data and software updates from a remote map service system, uploading harvested information to the remote map service system and/or a vehicle service system. Map observations can be shared with other applications such as navigation applications.

The entities associated with the vehicle map service may be associated with a plurality of types of uncertainty. For example, there may be uncertainty with respect to an object detection (e.g., the likelihood that an observed entity is actually present). Uncertainty may be expressed using a joint probability model. Uncertainty may be expressed using parameters derived from a joint probability model or simplifications of any probability model or density function. Covariances between likelihoods or variances representing a simplification of a more general probability density function or probability model can be used. Uncertainties may be expressed using any suitable parameter or value. By way of example, uncertainty may be expressed using means, variances, and/or covariances. As a specific example, consider a same sign which can be potentially in one of three positions, and for which each position there may be a probability where all three probabilities add to between 0.0 and 1.0. There may also be uncertainty with respect to some observed value of a parameter of an entity or a model (e.g. X, Y, or Z coordinate). The uncertainty may be with respect to what an error envelope looks like for that value (which may be a function of other values such as covariances).

According to some aspects of the present disclosure, a vehicle map service may include or otherwise utilize an uncertainty model that defines an uncertainty schema of uncertainty relations that is separate from an entity schema defined by a vehicle map model of the vehicle map service. The entity schema of the vehicle map model can use an entity address space to represent a plurality of entities of the vehicle map service. The uncertainty schema of the uncertainty model can use an uncertainty address space to represent a plurality of uncertainties associated with the plurality of entities. The uncertainty address space can be separate from the entity address space. Uncertainties represented in the uncertainty address space can point to one or more entities represented in the entity address space and/or relate entities within the entity address space.

Systems and methods are described that provide measures of uncertainty for map entities such as features provided in association with a vehicle map service. In example embodiments, data indicative of measures of uncertainty can be overlaid in a map layer that is separate from one or more map layers that contain the underlying data to which the uncertainty measures apply. In some cases, the uncertainty measures can be provided separately from the data for which the uncertainty applies. According to some embodiments, the uncertainty information may be defined using relative coordinates that are not necessarily tied to a real-world coordinate system. The relative coordinates may be relative to multiple map entities (also referred to as map elements or map features) in some examples. Local relative coordinates can be defined by a first entity to describe another entity's relative uncertainty relative to the first entity. This allows multiple uncertainty measures to be provided for a single map entity, with each measure of uncertainty having a different reference point.

A first map entity may define a first uncertainty for a reference map entity using local coordinates relative to the first map entity, while a second map entity may define a second uncertainty for the reference map entity using local coordinates relative to the second map entity. Multiple uncertainty relations may be from different sources (e.g., camera, GPS, LIDAR, etc.), at different times, relative to different base features, or any combination of these. The described approach recognizes that so-called global uncertainty can be considered relative uncertainty to the earth as a feature. As a specific example, the distance between lane lines of a road may be known to a low level of uncertainty even though the location of each lane line in absolute space may have a high level of uncertainty. A measure of uncertainty may be provided with respect to the distance between lane lines. Another measure of uncertainty may be provided with respect to each lane line's location in space. Further, static objects that have a known location in space relative to another feature may be difficult to identify with high-precision relative to an absolute space (e.g., as described by GPS). For example, GPS coordinates for some features often only have meters-level accuracy represented by latitude and longitude coordinates, while the same features may have centimeter-level accurate positions relative to each other from sensors like cameras that can see both from close range. Measures of uncertainty may be provided for static objects using relative coordinates to other objects to enable multiple measures of uncertainty to be provided for the static object. Additionally, absolute measures of uncertainty may be provided.

By publishing uncertainty information in a manner that separates the uncertainty data from the underlying map data, devices may digest and combine the uncertainty information to determine more accurate information about object position, state, etc. Additionally, because the uncertainty is detached from the data itself, client systems can choose to take into account any or all of the associated uncertainty measures according to their capabilities to process each particular uncertainty measure. Moreover, the uncertainty schema can evolve independently of the entity schema. For instance, a new error model can be added to the uncertainty schema without forcing clients of the existing schema to be modified as would need to occur with an embedded uncertainty model. Accordingly, the uncertainty associated with map entities may be defined separately from the map entities, such as in a separate layer on top of a concrete map schema. In this manner, multiple uncertainties can be defined for map entities, clients can choose to ignore entities they don't understand, relative uncertainty can be expressed, and the uncertainty schema can be extended independently of the feature description schema.

According to some aspects, an uncertainty model can be or otherwise include an extrinsic model that defines an uncertainty schema of uncertainty relations that is separate from an entity schema provided by a map model. The entity schema of the map model can represent an entity based on its properties on the map. For example, the map model can represent a unique entity (also referred to as a "best guess" entity) using the entity schema. The map model can then be considered to be or otherwise define an address space containing such base entities.

In accordance with example embodiments, the plurality of entities associated with the vehicle map service may include a plurality of unique entities and a plurality of hypothesized entities. In this manner, the base entities in the address space of the map model can be divided into two groups. A first group can include the plurality of unique entities which are considered to be a current best estimate of an existing object that is unique among other unique entities, and a second group can include the plurality of hypothesized entities which are not guaranteed to be unique among other unique entities or hypothesized entities. According to some aspects, the entity address space of the vehicle map model can include a unique entity address space and a separate hypothesized entity address space.

In example embodiments, the use of an extrinsic uncertainty model enables a client device which is interested in just a unique entity map to consider only unique entities, whereas a client device which is interested in all possible entity hypotheses can consider the address space of both unique and hypothesized entities. In example embodiments, the unique entity space can correspond to a fused entity layer of a vehicle map service schema, and the hypothesized entity space can correspond to a set of non-fused, intermediate layers of the vehicle map service schema.

According to some aspects of the disclosed technology, an uncertainty schema of an uncertainty model can be or otherwise include a separate address space of uncertainty relations. The separate address space of the uncertainty schema can point to entities in the unique entity address space of unique entities or the hypothesized entity address space of hypothesized entities. Additionally or alternatively, the uncertainty schema can relate entities within either the unique entity address space or the hypothesized entity address space, as well as relate entities between the unique entity address space and the hypothesized entity address space.

In accordance with example embodiments, an uncertainty may be associated with the property of a single entity. In such instances, one or more external uncertainty relations can point to the entity's properties, describing error functions on or between properties of the entity. In other examples, an uncertainty may be associated with the properties of multiple entities. In yet another example, in addition to relating the joint probability models of parameters, an uncertainty relation can also model a joint existence relation between hypotheses.

In accordance with example embodiments, an uncertainty relation may have a context. The context may include a unique identification (ID) space that attaches to a relation to indicate where the relation came from. For example, if two relations have the same context ID, it may indicate that they came from the same source (e.g., the same image, the same scan, the same vehicle position, etc.). The context may also be used to associate a confidence with the source of the relation.

According to some aspects of the disclosed technology, an uncertainty schema of an uncertainty model may define a relation schema. For example, a pose relation, a clustering (also referred to as confidence) relation, and/or a mutual exclusion relation can be defined as part of the uncertainty schema to relate entities within the entity schema map model. Other types of relations may be defined as part of the relation schema.

A pose relation can be defined as part of the relation schema of an uncertainty model in accordance with example embodiments of the present disclosure. The pose relation can include a plurality of entity references that reference a plurality of entities of the map model. For example, the pose relation can include a reference to a base entity and a reference to a relative entity. The base entity can be held constant. For example, the base entity can establish the origin of the local coordinate frame in example embodiments. The base entity can be another entity in the map model, which could be for example a vehicle location for vehicle relative measurements. As another example, the base entity can be earth, which bases the uncertainty in earth-centered earth-fixed (ECEF) coordinates, for example. The relative entity can have a pose that is uncertain relative to the base entity. In example embodiments, a pose relation may also contain a pose model itself, such as a Gaussian pose model (e.g. mean and variances for all coordinate values). The pose relation may additionally or alternatively contain a velocity model. The velocity model can model the velocity vector and/or tensor of the relative entity with respect to the base entity.

A clustering relation or confidence relation can be defined as part of the uncertainty schema of an uncertainty model in accordance with example embodiments of the present disclosure. The clustering relation may address the common case of having a cluster of hypotheses for the existence and/or property state of a particular real-world entity. The clustering relation may reference two or more hypotheses which are taken to be the same entity, and can potentially assign a weight to each one, if relative weights are known. This relation may include an implicit "null hypothesis" that none of the referenced concrete hypotheses are correct.

A mutual exclusion relation can be defined as part of the uncertainty schema of an uncertainty model in accordance with example embodiments of the present disclosure. A mutual exclusion relation may relate to multiple hypothesized entities. A mutual exclusion relation may reference two or more hypothesized entities and indicate that the two or more hypothesized entities are not a same real-world entity. In some examples, a mutual exclusion relation may state a negative. For instance, a mutual exclusion relation may indicate that two or more hypothesized entities cannot be hypotheses of the same real-world entity. In some examples, a mutual exclusion relation may be used to relate observations of a similar type (e.g. sign, vehicle, etc.) that were made from the same image and are thus known to be different real entities. In some cases, a clustering relation between entities can indicate fundamentally that multiple hypotheses are of the same real-world entity. By contrast, a mutual exclusion relation can indicate fundamentally that multiple hypotheses are of different entities. The mutual exclusion relation can explicitly represent a constraint implied by a shared context in some examples. In example embodiments, where the confidence relation indicates fundamentally that "these hypotheses are of the same real entity," the mutual exclusion relation may indicate fundamentally that "these hypotheses are of different entities." In example embodiments, the intent of a mutual exclusion relation may be to explicitly represent one of the constraints implied by shared context. For example, all sign observations taken from a single image may be related with a mutual exclusion relation, as they cannot represent the same real-world sign.

Embodiments of the disclosed technology provide a number of technical effects and benefits, particularly in the areas of geographic information services for mapping, vehicle mapping based on local sensors, and the integration of geographic information with local vehicle observations. Additionally, one or more aspects of the disclosed technology may address issues that may arise when seeking to provide a practical system and method for incorporating locally-obtained sensor data and observations therefrom into existing maps, including fusing fractional maps to obtain a comprehensive and useful map. Such maps may be utilized in autonomous driving, semiautonomous driving, and/or with various driver assist systems such as breaking assist systems, blind-spot detection systems, velocity management systems, and the like.

An uncertainty model in accordance with example embodiments of the disclosed technology can provide representations of uncertainty of individual observations in a schema at a level of detail such that knowledge of the acquirer of an observation can reasonably be extracted from the content of the observation. For instance, rather than simply store that a sensor model "X" made an observation, such as a detection of an object, the system can directly apply the known error characteristics of sensor model "X" to the raw observation and produce a generic observation with a joint probability model on its property values that represent those characteristics. Additionally, in example embodiments, unrefined and/or inconsistent observations (considering a complete map to be a collection of consistent observations) can be combined meaningfully into a more refined, more consistent set of observations (relying on the recursive application of this process to steadily progress towards and maintain a fully refined and consistent map). By structuring an uncertainty model in such a manner, a more reliable and up-to-date map can be provided for a vehicle map service or other application.

The use of an uncertainty model that is separate from an underlying map model in accordance with example embodiments of the disclosed technology can enable the addition of new uncertainty models to an uncertainty schema as the uncertainty schema evolves. In this manner, the vehicle map service can provide a concept of some generally useful uncertainty relations (e.g., joint Gaussian envelopes between poses), and in situations where higher precision may be needed, more sophisticated special-purpose relations can be added to the uncertainty schema. In this manner, a vehicle map service protocol can enable the addition of additional models over time to provide further improvements without requiring reengineering an system.

The use of an uncertainty model that is separate from an underlying map model can additionally provide an uncertainty schema with independence from an underlying entity schema. For example, some clients receiving map data from the vehicle map service may want to know the full uncertainty model of every aspect of the map. By contrast, other clients may not want to know the full uncertainty model of every aspect of the map. For example, some clients may want a current, fully coherent, unique entity map that represents the highest probability projection of an uncertain map into a self-consistent map without any uncertainty at all. Other clients, however, may want to receive uncertainty information as map data from the vehicle map service. Such individual clients may ingest specific types of uncertainty information. For instance, some client devices may ingest only a highest likelihood hypothesis of the position of the vehicle for which the map is being generated, but may still want an error envelope around that single highest likelihood hypothesis. Indeed, some applications may not be able to cope with or incorporate every possible uncertainty mass function between every possible hypothesized property value of every possible hypothesized entity. While the vehicle map service may maintain that data in a map database, some clients may select to only digest a subset of the data at any given time.

In example embodiments, a vehicle map model and separate uncertainty model can provide a versioning and update history for the vehicle map service. For example, a particular client device may understand certain versions of certain types of relations and not others. By separating the uncertainty model from the map model, a client can ignore any relations they do not understand. In this manner, legacy client devices may understand the basemap without the added uncertainty information in situations where the map data is being generated via more recent version relations, and the legacy client isn't updated to understand those relations. Additionally and/or alternatively, a trapdoor may be provided if a current set of modeled relations are poorly formed. The current set of modeled relations may be deprecated and new relations may be defined without breaking older or newer clients.

In accordance with example embodiments of the present disclosure, a simple and scalable solution for modeling uncertainty is provided. In example embodiments, the uncertainty model may be unobtrusive to simple clients that do not want or elect to receive or otherwise to understand uncertainty information. For example, the basic map entities or entity records may not be cluttered with large sets of uncertainty modeling fields which have to be sifted through or ignored for simple providers or consumers of map data. This can enable clients to ignore (and possibly not even load) the parts that they don't understand or elect to receive. Such an approach can improve the operating efficiency of the vehicle map service, including reducing the computational resource usage of various computing devices within the vehicle map service.

In some examples, an uncertainty model may scale in size without disruption to the underlying map model or changes to the entity schema. For example, as uncertainty relations are added, existing records in the map model may not continue to increase in size. Additionally, the uncertainty model can progress over time without disruption to the underlying map model or changes to the entity schema. For example, if relations or models are deprecated, the basic objects of the map model may not become cluttered with deprecated fields, nor does the uncertainty model itself become cluttered with those fields.

In accordance with some example embodiments, an uncertainty model is able to represent both relative accuracy and absolute accuracy. In some instances, the uncertainty model can consider all error relations to be relative. For example, what may be referred to as absolute accuracy may be considered by the uncertainty model to be relative accuracy with respect to the earth itself as an entity of the map. Accordingly, the uncertainty model can be a relative model with a few specially defined entities. For example, specially defined entities may include the earth, a particular vehicle pose at a particular time, or a state plane coordinate origin of a particular geographic location such as a state.

In example embodiments, relative accuracy may provide an improvement to the idea of absolute position of features in an earth-coordinate space. The idea of absolute position may be problematic in situations where highly precise accuracy is desired due to, for example, natural forces. Many situations may introduce error terms, such as tectonic plate movement, tidal movement, thermal expansion of bridges and road materials, among others. Accordingly, example embodiments may provide local relative accuracy.

The use of an uncertainty model that is separate from an underlying map model can improve the safety of operating a vehicle (e.g., an autonomous vehicle, a semi-autonomous vehicle, and/or a manually driven vehicle) by providing a more consistent and accurate map based on the integration of observations from multiple sources in a safe manner. Indications of uncertainty can be provided so that client systems receiving map data based on the map model can utilize the uncertainty in performing operations of the vehicle level.

With reference now to the Figures, example aspects of the present disclosure will be disclosed in greater detail. FIG. 1 depicts an example computing environment 100 in which a vehicle map service in accordance with example embodiments present disclosure may be implemented. Example computing environment 100 is one example of a system that can be used to perform operations associated with geographic information according to example embodiments of the present disclosure. As shown in FIG. 1, example computing environment 100 can include a network 102, a vehicle 110, vehicle map service data 112, a vehicle map service data service 113, a vehicle map service system 114, one or more vehicle map service clients 115, one or more vehicle systems 116, one or more basemap service systems 118, a remote map service system 120, a map information service 121, vehicle map service data 122, map data 124, sensor data 126, uncertainty data 128, a remote vehicle service system 130, a vehicle information service 131, vehicle map service data 132, map data 134, sensor data 136, and uncertainty data 138.

The vehicle 110 can include any device used to carry or transport persons or cargo including an automobile, a bus, a cargo truck, an aircraft (e.g., airplane and/or helicopter), and/or watercraft (e.g., boat or submersible vehicle). The vehicle 110 can include one or more computing systems (e.g., a computing system including one or more computing devices, at least one of which includes one or more processors and one or more memory devices including tangible non-transitory computer readable media) including the vehicle map service system 114 that can perform one or more actions or operations including sending, receiving, processing, generating, and/or storing data (e.g., vehicle map service data).

The vehicle map service system 114 can communicate (e.g., send or receive one or more signals or data) with one or more client systems including: the one or more vehicle systems 116 (e.g., a navigation system that can receive vehicle map service data and output a local map via graphical user interface displayed on a display device); and/or vehicle map service clients 115 which can subscribe to and/or publish vehicle map service data. Further, the vehicle map service system 114 can include a vehicle map service data service 113 that can be configured to manage and provide information associated with the vehicle 110 to clients and/or other subscribing entities. The vehicle map service system 114 can also manage, send, and/or receive information associated with the one or more basemap service systems 118 which can include one or more computing devices and/or software applications that can perform one or more actions and/or operations associated with providing a basemap (e.g., a basemap of an area traversed by a vehicle).

Furthermore, the vehicle map service system 114 can activate and/or communicate with the one or more vehicle map service clients 115 and/or the one or more vehicle systems 116 of the vehicle 110 to perform vehicle-related functions. For example, the vehicle map service system 114 can send one or more signals or data that are used by a vehicle control system to cause a vehicle steering system to change the position of the vehicle 110's wheels and change the direction of travel of the vehicle 110.

The vehicle client systems can include various systems of the vehicle 110 that can perform one or more operations or functions including processing vehicle map service data that includes map data associated with the state of a geographic area (e.g., one or more maps), sensor data associated with the state of an environment external to the vehicle 110, and/or machine-learned model data associated with one or more machine-learned models that can be used to detect and/or recognize objects external to the vehicle 110. Further, the client systems (e.g., the vehicle map service clients 115 and/or the one or more vehicle systems 116) can include one or more display devices (e.g., LCD monitor) that can be used to output information including information associated with the vehicle map service data and/or the vehicle map service system 114. Further, the vehicle client systems can include one or more input devices (e.g., touchscreen, keyboard, and/or microphone) that can be used to input information for use by the vehicle map service system 114.

The vehicle 110, the vehicle map service system 114, the remote map service system 120, and/or the remote vehicle service system 130 can communicate (e.g., send and/or receive one or more signals or data including the vehicle map service data) via the network 102. The network 102 can include any type of communication network, including a local area network (e.g. an intranet), wide area network (e.g. the Internet), a cellular network, or some combination thereof. Further, the network 102 can also include one or more direct connections that can be used for direct communication between the vehicle 110, the vehicle map service system 114, the remote map service system 120, and/or the remote vehicle service system 130. Communication can be carried via network 102 using any type of wired and/or wireless connection, using a variety of communication protocols (e.g. TCP/IP, HTTP, SMTP, and/or FTP), encodings or formats (e.g. HTML or XML), and/or protection schemes (e.g. VPN, secure HTTP, or SSL).

The remote map service system 120 (e., a geographic information system provider) can include one or more computing systems (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data).

The remote map service system 120 can store and/or perform operations on the vehicle map service data 122 which can include the map data 124, the sensor data 126, and/or the uncertainty data 128. The remote map service system 120 may include a map information service 121 configured to manage and provide map information to clients or other subscribing entities. The map data 124 can be associated with and/or include geographic data including one or more maps that are indexed according to geographic coordinates (e.g., latitude, longitude, and/or altitude) of its constituent elements (e.g., locations). The map data associated with the remote map service system 120 can further include route data, geographic imagery, and/or data associated with various waypoints (e.g., addresses and/or geographic coordinates).

The sensor data 126 can include data associated with one or more sensor outputs of the vehicle 110. For example, the sensor data can include one or more outputs from one or more LIDAR devices, one or more cameras, one or more microphones, one or more sonar devices, and/or one or more radar devices. Machine-learned model data (not shown) can include one or more machine-learned models or training data associated with one or more machine-learned models that can be used by the vehicle 110 to detect and/or recognize the state of the environment external to the vehicle 110. For example, the machine-learned model data can include a plurality of machine-learned models that can be used by the vehicle map service system 114 to detect and/or recognize one or more objects, scenes, and/or events. Furthermore, the machine-learned model data can include field collected data that is associated with sensor observations (e.g., image data, radar data, sonar data, LIDAR point cloud data, and/or audio data) from one or more sensors (e.g., one or more cameras, one or more radar devices, one or more sonar devices, one or more microphones, and/or one or more LIDAR devices). In some embodiments, the remote map service system 120 can communicate directly with the vehicle 110, the vehicle map service system 114, and/or the remote vehicle service system 130.

The remote vehicle service system 130 can store and/or perform operations on the vehicle map service data 132 which can include the map data 134, the sensor data 136, and/or the sensor data 136. The remote vehicle service system 130 may include a vehicle information service 131 configured to manage and provide vehicle information to clients or other subscribing entities. The map data 134 can be associated with and/or include geographic data including one or more maps that are indexed according to geographic coordinates (e.g., latitude, longitude, and/or altitude) of its constituent elements (e.g., locations). The map data associated with the remote vehicle service system 130 can further include route data, geographic imagery, and/or data associated with various waypoints (e.g., addresses and/or geographic coordinates).

The sensor data 136 can include data associated with one or more sensor outputs of the vehicle 110. For example, the sensor data can include one or more outputs from one or more LIDAR devices, one or more cameras, one or more microphones, one or more sonar devices, and/or one or more radar devices. In some embodiments, the remote vehicle service system 130 can communicate directly with the vehicle 110, the vehicle map service system 114, and/or the remote map service system 120.

Uncertainty data 128 and/or uncertainty data 138 can include, by way of example, measures of uncertainty that are provided for any entity or observation such as road signs, vehicles, pedestrians, objects, etc. Signs may be statistically modeled, and are one example of a feature that can be harvested from the vehicle map service observations from sources such as sensor observations from sensors. For instance, the error of the pose of a sign may be modeled. For example, the basic model of pose error may be a joint gaussian with a joint probability on the coordinates. An error envelope may be defined with respect to, and in the context of, a particular vehicle pose. For example, the confidence in the sign's existence may be modeled. Additionally, or alternatively, the confidence in the meaning/transcription/qualifiers of the sign may be modeled.

The vehicle 110 can include software and/or data including vehicle services that can include mapping applications and services that can be arranged in a stack from high level to low level. The vehicle services can include: a service that provides a user-facing maps application; mobile services that utilize mobile APIs and/or frameworks (e.g., Maps APIs); data services including framework-level management of data caches including maps and/or other data as well as communications with other devices or systems via networks (e.g., the network 102) and/or interconnects in the vehicle 110. Further, the vehicle services can include an embedded version of the vehicle services that can be adopted by vehicles that are otherwise incompatible with the vehicle map service data. The vehicle 110 can also include a real-time operating system that can manage systems closer to the hardware of the vehicle 110.

The remote map service system 120 can include various software and/or services. The remote map service system 120 can include map data including semantic map data and traffic data. The remote vehicle service system 130 can include any service maintained by a vehicle service provider (e.g., an automobile producer or automobile service provider). Further the remote vehicle service system can utilize a distributed computing platform (e.g., a cloud platform) to provide the vehicle services. In some embodiments, the remote vehicle service system 130 can include a local copy of the maps maintained by the remote map service system 120. Further, in some embodiments, various other computing systems can interact directly with the vehicle 110, the remote map service system 120, and/or the remote vehicle service system 130.

The remote map service system 120 and the vehicle 110 can send and/or receive data including: map data updates to the vehicle 110 which can include map data and traffic data, synchronized through the vehicle services into local memory and caches. Some of the map data sent and/or received by the remote map service system 120 and the vehicle 110 may be passed to the real-time operating system of the vehicle 110 as part of vehicle-internal protocols. Further, the remote map service system 120 and the vehicle 110 can send and/or receive data including sensor observations from the vehicle 110 which can be passed from a real-time operating system to the remote map service system 120 via vehicle-internal protocols. The sensor observations can include a local map representation of the environment detected by the vehicle 110. The local map can include objects and/or markings observed by sensors of the vehicle and can be provided in a format that matches the format of data provided to the remote map service system 120 or the vehicle 110. In some embodiments, the sensor observations can include a delta (e.g., a difference or change in state or value) from previously provided data including anomalies and new observations. Further, the remote map service system 120 and the vehicle 110 can send and/or receive data including tracks information that can include information associated with a vehicle's location and route tracking, with, in some embodiments, location data passing from the vehicle 110 to the remote vehicle service system 130. The locations included in the location data can include raw positional data (GPS), and/or map-matched data in relation to the map and route known by the vehicle 110 (e.g., progress along the current road, lane, or route). Services data sent and/or received between the remote map service system 120 and the remote vehicle service system 130 can include navigation, which can include search and directions.

The remote map service system 120 and the remote vehicle service system 130 send and/or receive data including data provided through APIs including map APIs and can include directions, places, tiles, and/or roads. Further, the data flows between the remote map service system 120 and the remote vehicle service system 130 can include updates that can be synchronized to the remote vehicle service system 130 for analysis; and edits including any corrections and/or additions to vehicle map service data that a third party computing system can submit to the remote vehicle service system 130 based on analysis or their own feedback. Further, the remote map service system 120 can include a pipeline that can evaluate and receive those edits, and provide credit to the 3rd party service for quality improvements.

The remote vehicle service system 130 and the vehicle 110 can send and/or receive data associated with services that can be used to pass along opaque data in both directions between the remote vehicle service system 130 and the vehicle 110 and which can user networking in the operating system and following data use policies. Further, the remote vehicle service system 130 and the vehicle 110 can send and/or receive data including software updates and/or sensor data.

Figure 2:
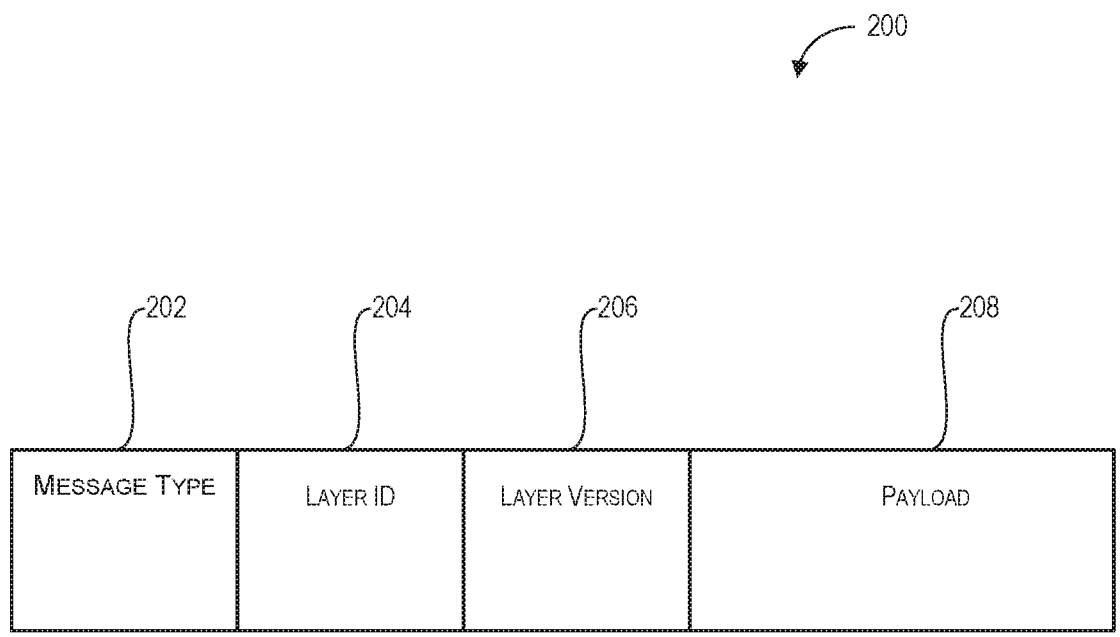
FIG. 2 depicts an example of a data structure for vehicle map service data in accordance with example embodiments of the present disclosure.

FIG. 2 depicts a diagram including an example of vehicle map service data according to example embodiments of the present disclosure. One or more portions of vehicle map service data 200 can be executed or implemented on one or more computing devices or computing systems including, for example, the vehicle map service system 114, the remote map service system 120, and/or the remote vehicle service system 130. Further, one or more portions of the vehicle map service data 200 can be executed or implemented as an algorithm on the hardware components of the devices disclosed herein.

As shown in FIG. 2, the vehicle map service data 200 can include a message type 202, a layer ID 204, a layer version 206, and a payload 208. The message type 202 can include one or more portions of data that can be used to identify a type of message associated with a portion of the vehicle map service data 300. For example, the message type 202 can indicate whether the vehicle map service data 200 is being used to: subscribe one or more portions of the vehicle map service data to a vehicle map service client system and/or the status of the subscription; publish one or more portions of the vehicle map service data 200 by a vehicle map service client system and/or a status associated with publishing the one or more portions of the vehicle map service data 200; and/or communicate (e.g., send or transmit) a portion of the vehicle map service data 200 to a vehicle map service client system. Furthermore, the message type section can indicate the intent or goal (e.g., a goal to subscribe, unsubscribe, or to update data) associated with layer, for example, as a request to subscribe to a layer, or an intention to send data about the layer. For messages that are used to publish, the provider ID, the layer, and/or the layer version can be provided together with the payload in order that the payload may be routed correctly.

The layer ID 204 can include one or more portions of data that can be used to identify a layer associated with the vehicle map service data 300 and/or the source of the vehicle map service data 200 (e.g., a vehicle map service client system). For example, the layer ID 204 can include information indicating that the vehicle map service data is associated with a road centerlines layer and in this way, client systems that are subscribed to the road centerlines layer can access the vehicle map service data 200.

The layer version 206 can include one or more portions of data that can be used to identify a layer version associated with the vehicle map service data 200. For example, the layer version can indicate whether the version of the vehicle map service data 200 is compatible with the vehicle map service client system that is attempting to access the vehicle map service data 200.

The payload 208 can include one or more portions of the vehicle map service data 200 that are being communicated. The payload 208 can include any information associated with one or more signals or data including one or more maps, one or more sensor outputs, and/or one or more machine-learned models. For example, the payload 208 can include information associated with the state of traffic in an area currently being traversed by a vehicle (e.g., the vehicle 110).

Figure 3:
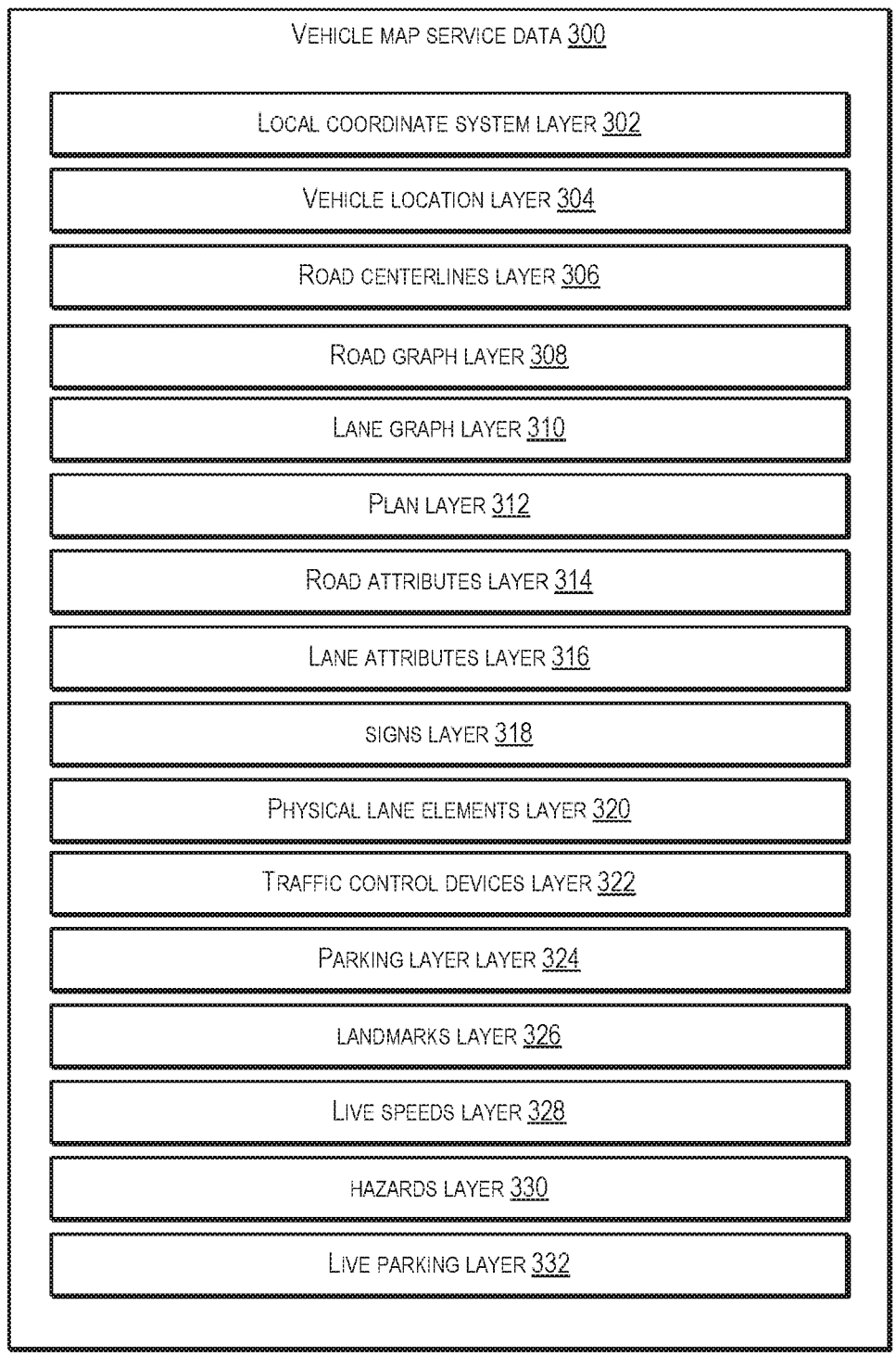
FIG. 3 depicts a block diagram of an example of vehicle map service data layers in accordance with example embodiments of the present disclosure.

FIG. 3 depicts a diagram including an example of vehicle map service data layers according to example embodiments of the present disclosure. One or more portions of a vehicle map service data 300 can be stored on one or more computing devices using any suitable memory. The vehicle map service data 300 can be implemented using a vehicle map service protocol and/or schema in example embodiments. In some examples, vehicle map service data 300 can be executed or implemented on one or more computing devices or computing systems including, for example, the vehicle map service system 114, the remote map service system 120, and/or the remote vehicle service system 130. Further, one or more portions of the vehicle map service data 300 can be executed or implemented as an algorithm on the hardware components of the devices disclosed herein.

As shown in FIG. 34, the vehicle map service data 300 includes a plurality of layers, examples of which may include a local coordinate system layer 302, a vehicle location layer 304, a road centerlines layer 406, a road graph layer 308, a lane graph layer 310, a plan layer 312, a road attributes layer 314, a lane attributes layer 316, a signs layer 318, a physical lane elements layer 320, a traffic control devices layer 322, a parking attributes layer 324, a landmarks layer 326, a live speeds layer 328, a hazards layer 330, and/or a live parking layer 332.

The plurality of layers in the vehicle map service data 300 can be accessed by one or more computing systems and/or one or more computing devices including the vehicle map service system 114, the remote map service system 120, and/or the remote vehicle service system 130. Further, each of the plurality of layers can be associated with information including a message type (e.g., the message type 202 in FIG. 2), layer ID (e.g., the layer ID 204 in FIG. 3), and layer version (e.g., the layer version 206 in FIG. 2).

Furthermore, a plurality of service systems (e.g., the vehicle map service system 114, the remote map service system 120, and/or the remote vehicle service system 130) can selectively subscribe to different layers (e.g., layers that include vehicle map service data that the respective vehicle map service client system will consume), ignoring layers that do not include required information. The service systems can also publish vehicle map service data that is associated with the layers. The published layers can then be consumed by other service systems that subscribe to the respective layer.

A vehicle map service protocol can be used to implement the vehicle map data. The vehicle map service protocol can include a shared featureless basic model (e.g., a base map) of the world and a local coordinate frame that can serve as a reference. The vehicle map service protocol can include layers of data, which can be stacked on other layers of data, and can be used to form a model of the world. Individual clients (e.g., client systems and/or service systems) can be subscribed to certain layers (e.g., layers that are of interest) and can ignore certain other layers that include information that is not of interest. These layers can include pre-mapped data (e.g., a map based on previously gathered satellite imagery) and dynamic sensor observations from various data sources (e.g., client systems including vehicle systems; and/or various remote computing systems including remote map service systems and/or remote vehicle service systems), that can share a common frame of reference around the vehicle (e.g., the different data sources are focused on the same geographic area around the vehicle).

Each layer of the map can include data associated with various types of entities and the properties of the entities. The layers can represent data flowing between the plurality of service systems including data flowing between a remote map service system (e.g., a geographic information system service provider (GIS) that is operated on a computing system) and a vehicle (e.g., a vehicle that includes one or more vehicle client systems), between a remote map service system and a remote vehicle service system (e.g., a vehicle service provider that provides services to a vehicle), and between a remote vehicle service system and a vehicle.

Each layer's data can be published in the form of packets of a predetermined type. The schema of these packets can be versioned such that a data packet for version X of layer A is a protocol message. New versions of layer packets can evolve over time. In one implementation, once a version is published, modifications to that version can be limited or restricted.

In some embodiments, layers can operate independently and layers can also cross-reference each other. Further, the plurality of layers can include a common local coordinate frame definition. If an object is described in multiple layers within a consistent epoch, for instance given a road segment's attribute and geometry layers, they can use the shared object ID to refer to that object. For example, the object ID can include an identifier used to identify an object.

In some embodiments, layers can be ordered by complexity. This may provide forward compatibility. For instance, earlier layers can represent simple and common scenarios that are already achievable with current maps and vehicles. Subsequent layers can then be added, which may relate to newer data, different data, or more advanced forms of data as the requisite new types of map data and/or new types of vehicle technology become available (e.g., new versions of data and/or different data protocols).

A portion of the vehicle map service data (e.g., a packet) can include a message type section, a layer id section, a layer version section, and a payload section. The message type section can indicate the type of data which may be used to determine how to interpret the content of the message. For example, the message type can be associated with the type of API call that a message is making. For messages that are used to publish, the provider ID, the layer, and/or the layer version can be provided together with the payload in order that the payload may be routed correctly. Further, different message types can be used to add subscriptions, remove subscriptions, or provide information about the state of a subscription. The payload of the message can also be associated with the message type. The layer id section can include an identifier for a particular layer. The layer version section can include an identifier for the version of the particular layer. The payload can include the data being communicated for the particular layer (e.g., sensor data associated with one or more sensor observations of a vehicle).

The local coordinate system layer can include data and/or information associated with a coordinate system (e.g., x, y, and z coordinates corresponding to latitude, longitude, and altitude respectively) including the current coordinate system used by the vehicle. The local coordinate system layer can be used to transform any local geometry and/or set of positions to the global coordinate system (e.g., a coordinate system used to describe locations on the Earth) or to transform a global coordinate system to a local geometry and/or set of positions.

The vehicle location layer can include data and/or information associated with a self-consistent description of an instantaneous location of the vehicle (e.g., the location of the vehicle at the current moment in time). This location can be associated with aspects including the vehicle's physical location (e.g., pose within the world or local coordinate frame, absolute velocity and/or acceleration) or the vehicle's semantic location (e.g., which road segment the vehicle is currently on and where the vehicle is on the road segment, scalar velocity along the segment, and/or which lane the vehicle is in). The vehicle location layer can include atomic information (i.e. sensor data including a raw sensor measurement from one or more sensors of the vehicle) or fused/derived information (e.g., a map match including the vehicle location on a map; and/or a fused location of the vehicle based on multiple sources) depending on the remote data source (e.g., map provider) that generates the data associated with the vehicle location layer (e.g., a location packet).

While the vehicle location layer can be the substrate on which location information for the current vehicle is broadcast, observations and information about the presence and location of other vehicles may also be included on the vehicle location layer. Vehicle location layer packets can describe observations of either the current vehicle or other vehicles by referencing different object identifiers (e.g., object IDs), thereby allowing the vehicle location layer to generalize to the state of vehicles in the area including the current vehicle. Other clients can add (e.g., publish) locations of other vehicles derived from vehicle sensors, vehicle-to-vehicle, and/or vehicle-to-infrastructure clients associated with the vehicle.

The centerline geometry of the road centerlines layer can be used as a reference for comparing the position of an object to the road (e.g., for use in map matching vehicle position). The (x, y) sequence can be used to understand the curvature of the road, to anticipate upcoming turns.

The road graph layer can expand upon the road centerlines layer by associating each segment with a description of the connectivity of that segment with adjacent segments. This information can be joined with the road centerline layer to create a complete view of the road graph in an area around the vehicle.

The lane graph layer can be used to describe the configuration of lanes for each road segment, and the subdivision of the road graph into lanes and lane connections. The lane graph layer can focus on the logical graph for the lane network, lane attributes or physical geometry can be described in subsequent layers.

The plan layer can be used to annotate the local road and lane graph according to the current plan or route. The plan layer can enable the vehicle to determine which roads or lanes ahead are to be followed for the current navigation route.

The road attribute layer can be used to describe relatively static attributes of road segments. These attributes can derive from segment attributes in a database associated with a remote map service system (e.g., a GIS service provider system), and can be focused on attributes used for vehicle awareness and safety or on attributes used for navigation or rendering.

The lane attributes layer can include data and/or information associated with lane-specific attributes, for example, as an added level of detail to the road attribute layer. The attributes of the lane attributes layer can be based on lane attributes in the remote map service system (e.g., geographic information system service provider database).

The signs layer can include data and/or information associated with physical signs visible from road segments, including sign type, contents, and three-dimensional position information. For example, signs can include speed limit signs observed when traveling on a road, including the speed limit text on the sign. Signs can be classified into sign types including speed limit or road names. In some embodiments, signs can be selectively modeled with priority given to describing signs relevant to driving, including those signs defining traffic rules. Furthermore, the three-dimensional position of lanes, segments, and/or vehicles can be an absolute position or a relative position (e.g., relative to a lane or segment). The relative position can include a Cartesian (e.g., {x,y,z} offset from the lane or segment) or parametric (e.g., a distance along a lane or segment, cross-track distance left or right of the lane or segment, or a height above or below a lane or segment).

The physical lane elements layer can describe the physical properties of lanes. Further, the road geometry layer can be used as a supplemental and optional layer in addition to the semantic lane graph and attributes. The prior semantic lane data can be used when looking up lane information for route planning, guidance, or lane-level traffic. Physical lane elements can be used to assist in lane recognition and more tactical decision making.

The traffic control devices layer can be used to describe the locations, attributes, and state of traffic control devices, including stoplights and/or stop signs. The traffic control devices layer can include indications for the operational status of traffic control devices (e.g., operational, non-operational, or malfunctioning).

The parking attributes layer can describe parking attributes of the road, including where spots are located, whether the parking is publicly or privately owned, whether the parking is associated with a payment, or parking rules. In some implementations, live parking availability can be provided.

The landmarks layer can be used to describe landmarks visible from the road, and can include the three-dimensional position of each landmark. Further, the landmarks layer can be used for localization. Attributes of the landmarks layer include a position including coordinates (e.g., x, y, z, coordinates corresponding to latitude, longitude, and altitude) that can be used to determine the position of the landmark; and a visibility that can be used to determine a distance from which the landmark is visible based on the vantage point (e.g., the vantage point of a vehicle at a particular location). The live speeds layer can be used to annotate roads and lanes with live speed estimates derived from objects including other vehicles or other points of reference. Attributes of the live speeds layer can include a position attribute including coordinates (e.g., x, y, z, corresponding to latitude, longitude, and altitude) that can be used to determine positions including the position of one or more vehicles on roads and lanes; a speed attribute, which can be expressed as a rate of movement of vehicles in the roads and lanes and can be associated with the position of vehicles at particular positions (e.g., the speed in kilometers per hour of a vehicle at position x, y, z); and time including the time associated with the live speeds layer updates (e.g., the time associated with a particular speed in kilometers per hour of a vehicle at particular location).

A hazards layer can include data and/or information associated with annotation of roads and lanes with traffic incidents, hazards, and/or blockages. For example, hazards can include areas undergoing construction, natural hazards (e.g., flooding, fire, heavy rain, and/or heavy snowfall), and other potentially harmful events that can obstruct or delay the movement of a vehicle.

The live parking layer can be associated with annotations of roads and/or parking lots including information about live parking availability (e.g., the availability of parking at a current time). Further, the live parking layer can be updated in real-time (e.g., a continuous stream of data about the availability of parking can be received by the vehicle from one or more remote data sources including other vehicles, remote geographic information service providers). The vehicle map service data can include sensor data associated with one or sensor outputs from one or more sensors. The one or sensor outputs from the one or more sensors can include information associated with one or more states of one or more areas (e.g., geographical areas) detected by the one or more sensors. In some embodiments, the one or more sensors can include one or more image sensors (e.g., one or more cameras), one or more acoustic sensors (e.g., one or more microphones), one or more light detection and ranging devices (e.g., LIDAR devices), one or more infrared sensors, radar, sonar, one or more thermal sensors, and/or one or more radar devices. Further, the one or more sensors can be configured to detect the state (e.g., a physical state) of the one or more geographic areas including one or more properties of the one or more geographic areas. The vehicle map service system can also associate the one or more sensor outputs with a time at which the one or more sensor outputs were received. The one or more properties of the one or more geographic areas can include one or more (e.g., time of day, geographic location (e.g., a latitude, longitude, and altitude), size (e.g., a height, length, and/or width), mass, volume, color) and one or more semantic properties that can be determined by the vehicle map service computing system based at least in part on the one or more sensor outputs (e.g., the semantic information associated with road markings, road signs, road segments, and/or road intersections).

By way of example, a vehicle map service system can include a vehicle with sensors (e.g., three cameras) that publish sign information (e.g., three cameras report different parts from a cluster of signs on the highway), a remote map service system (e.g., a map data provider) that publishes what signs to expect, and a sign fuser client that uses the data from the cameras and the remote map service system and publishes fused sign information. As such, a vehicle map service client system that consumes sign information can subscribe to sign messages, receive messages from the various sources, and can determine the sign messages to use and how to resolve conflicts.

In some embodiments, the vehicle map service data can be formatted according to a vehicle map service protocol. Further, a new field can be added to the layer protocol for use in identifying a fused layer. Additionally, the layer protocol can include fields for a layer identifier, a layer version, and a fuse level. The fuse level field can identify the level of fusing for the subscribed information.

Figure 4:
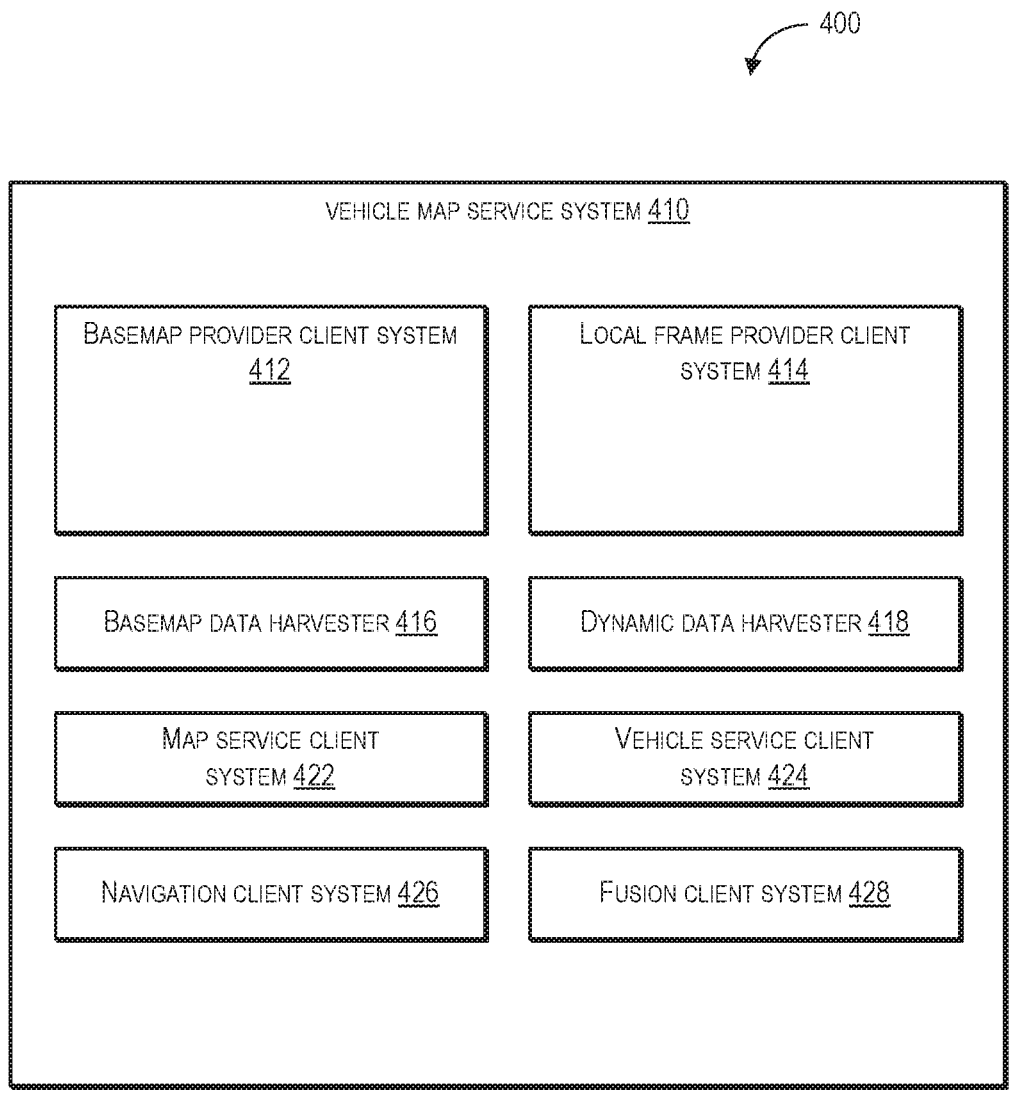
FIG. 4 depicts a block diagram of an example vehicle service system in accordance with example embodiments of the present disclosure.

FIG. 4 depicts an example of service systems according to example embodiments of the present disclosure. A computing system 400 (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data) according to example embodiments of the present disclosure. Further, one or more of the instructions executed or implemented on the system 400 can be executed or implemented on one or more computing devices or computing systems including, for example, the vehicle map service system 114, the remote map service system 120, and/or the remote vehicle service system 130. Further, one or more of the instructions stored on the memory device for ten can be executed or implemented as an algorithm on the hardware components of the devices disclosed herein.

As shown in FIG. 4, the computing system 400 includes a vehicle map service system 410; a basemap provider client system 412, a local frame provider client system 414, a basemap data harvester 416, a dynamic data harvester 418, a map service client system 422, a vehicle service client system 424, a navigation client system 426, and a fusion client system 428.

In some embodiments, the vehicle map service system 114 can include one or more data services client systems that can be used to bridge the local map in a vehicle (e.g., the vehicle 110) with map data that is stored remotely (e.g., stored in a cloud computing system). The one or more data services client systems can manage the download and caching of basemap data over vehicle connections (e.g., WAN), dynamic distribution of local map data via the VMS service, and capture and upload of sensor and autonomous vehicle system observations for processing. These data services client systems can be used to determine the vehicle's dynamic position, for example, transforming local map data used by the vehicle into the vehicle's reference frame, and publishing that data for a user by the service systems.

The data services clients can include, for example, a basemap provider client system 412, a local frame provider client system 414, a basemap data harvester 416, and a dynamic data harvester 418. The local frame provider can provide a shared local Cartesian coordinate frame near the vehicle to simplify processing of localized map data. The data service client systems can publish a continuously updated coordinated local reference frame for the other client systems of the vehicle map service system.

In some embodiments, another remote map service system can manage a local cache of map data provided by geographic information system cloud computing systems and downloads and incorporate dynamic data inputs including traffic or a dynamic local map to the VMS core around the vehicle's current location, which can then be rebroadcast to service systems that are subscribed.

The basemap data harvester 416 can listen on the VMS service for other service systems observed variations of the world from published basemap data, buffers or processes locally as necessary, and can send to a remote service for central integration when connectivity is available. The basemap data harvester 416 can be used to update a fairly static map with corrections to road attributes and geometry. For example, if a basemap provider broadcasts an intersection with two outgoing roads, and the vehicle's driving engine rebroadcasts a sensor-fused map showing a third outgoing road observed by sensors, this service can compute the difference and store the evidence of a new road segment for later upload to the remote map service system (e.g., the geographic information system cloud computing system).

Further, the dynamic data harvester 418 can receive dynamic observations from other client systems of the vehicle map service system 114, including location tracks and/or hazards/incidents and can ensure that these observations are shared in a timely fashion with a live service. In addition to current GPS-based location tracks, the dynamic data harvester 418 can receive map-registered information derived from sensor fusion with the geographic information system service provider map, such as positions associated with an identified road or lane.

Various clients of the vehicle map service system 410 can communicate with the data services clients including: a map service client system 422, a vehicle service client system 424, a navigation client system 426, a data fusion client system 428, and/or other client systems associated with other vehicle client systems (e.g., a dashboard camera client system). For instance, the vehicle service client system 424 can receive local map data relevant to vehicle safety, efficiency, and/or autonomy. The vehicle service client system 424 can in turn provide map observations from sensors, using on-board recognition and reasoning to turn sensor data into semantic map-registered data. The vehicle service client system 424 can operate on a separate real-time operating system, and communicate to a vehicle operating system via in-vehicle networking.

The navigation client system 426 can communicate with various navigation applications including other navigation client systems that operate on other remote map service systems. Data and/or information managed by navigation applications can annotate the local map in terms of current route intent, and can also provide enhanced location tracking and map matching support to improve turn-by-turn guidance and route tracking.

Figure 5:
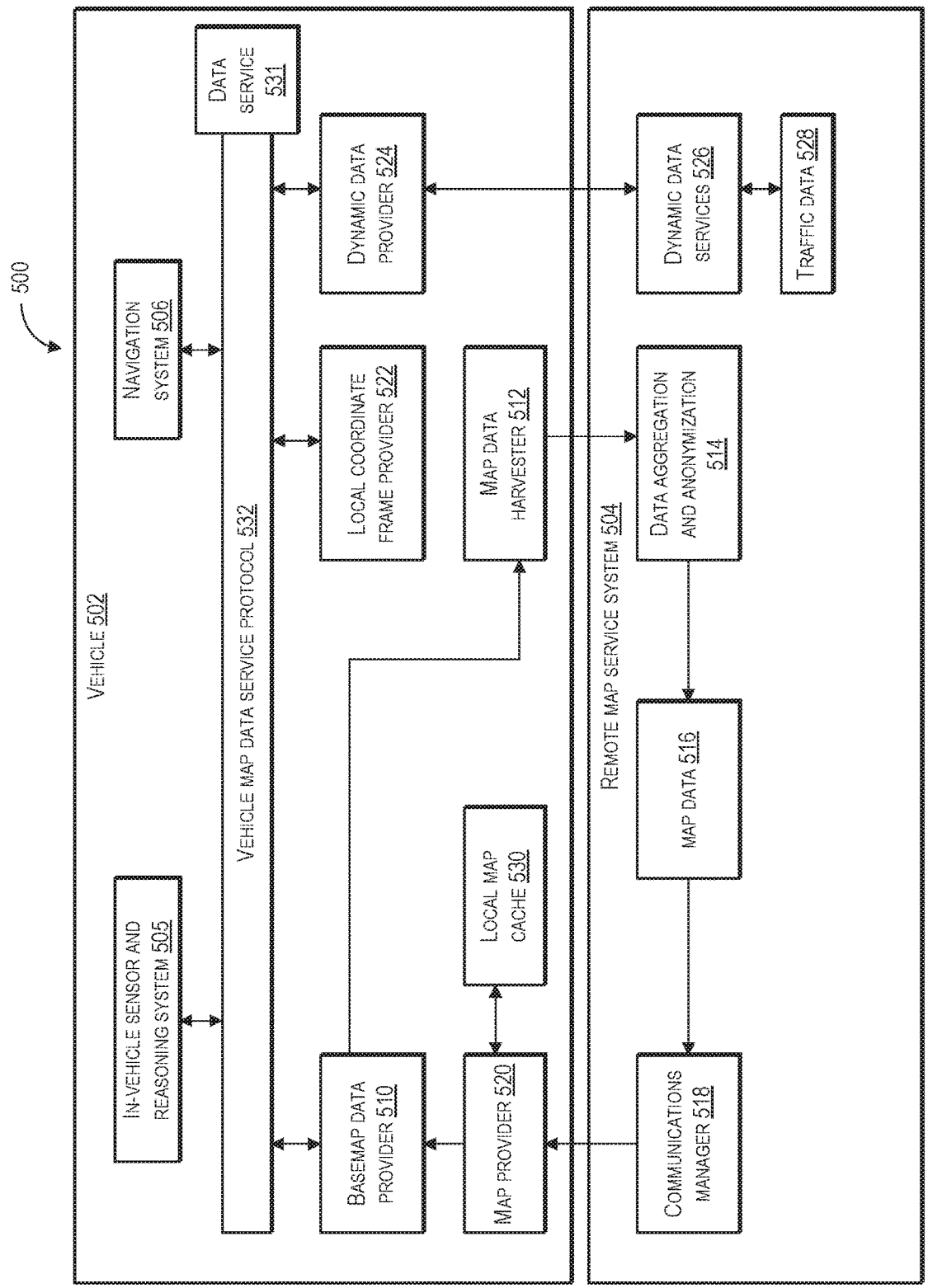
FIG. 5 depicts a block diagram of an example computing environment including a vehicle service system in accordance with example embodiments of the present disclosure.

FIG. 5 depicts a block diagram of an example computing environment 500 including a vehicle service system in accordance with example embodiments of the present disclosure. Computing environment 500 can include one or more computing systems at a vehicle 502 and remote map service system 504. Computing environment 500 includes an in-vehicle sensor and reasoning system 505, a navigation system 506, a basemap data provider 510, a map data harvester 512, a data aggregation and anonymization system 514, map data 516, communications manager 518, a map provider 520, a local coordinate frame provider 522, a dynamic data provider 524, dynamic data services 526, traffic data 528, local map cache 530, vehicle mapping service (VMS) data service 531, and a vehicle map service protocol 532.

The VMS data service 531 can manage the flow of data between clients by capturing data from providers and re-broadcasting data to subscribers using a vehicle map service protocol 532. The vehicle map service (VMS) protocol can be a data protocol that permits construction and sharing of a dynamic model of a map surrounding a vehicle (e.g., the vehicle 502). The VMS protocol 532 can provide a common language and world model for map data providers and consumers, ranging from basemap and traffic providers to the sensor and real-time operating systems of the vehicle 502.

A vehicle can include an in-vehicle sensor and reasoning system 505 and a navigation system 506 with which the vehicle can send or receive data including vehicle map service data. The in-vehicle sensor and reasoning system 505 can include one or more sensors (e.g., one or more LIDAR devices, cameras, sonar, and/or radar) that can be used to generate sensor data based on the state of the environment external to the vehicle 502. Further the in-vehicle sensor and reasoning system 505 can determine the state of the environment external to the vehicle 502 based at least in part on the sensor data. The navigation system 506 can include one or more devices that can be used to determine the local or global location of the vehicle 502 (e.g., GPS systems and/or proximity sensors).

The basemap data provider 510 can send and/or receive vehicle map service data to and from the vehicle 502. The vehicle map service data managed by the basemap data provider 510 can include a local map of an area within a predetermined distance of the vehicle 502. The basemap provider can publish a dynamic map associated with the location of the vehicle 502 which can be subscribed to by client systems (e.g., vehicle systems) of the vehicle 502.

The map data harvester 512 can listen for different variations of an area that are provided by other service systems (e.g., other vehicles) and can receive data associated with changes in the state of an area (e.g., changes in road segments or lane segments) that can be compared and stored for later use by the other service systems. Further, the map data harvester 512 can send data to the data aggregation and anonymization system 6 514 14.

The data aggregation and anonymization system 514 can receive data from multiple vehicle map service clients including the map data harvester 512. Further, the data aggregation and anonymization system 6 514 14 can aggregate the data received from various vehicle map service clients and remove personally identifying information from the vehicle map service data. In this way, the privacy of service systems can be enhanced.

The data from the data aggregation and anonymization system 614 can include the map data 516 which can include anonymized information about the map of the area in which the vehicle 502 is present. The map data 516 can be used by the communications manager 518. The communications manager 518 can manage copying map data from a remote system (e.g., the remote vehicle service system and/or the remote map service system) to a local system of a vehicle (e.g., the vehicle map service system). For example, the communications manager 518 can include services associated with determining that the map data for an area (e.g., an area of interest) has been transmitted from the remote map service system to a client system (e.g., a vehicle) in communication with the remote map service system. In this way, the recipient of the map data does not lack map data.

The data from the communications manager 518 can be sent to a map provider 520 which can send and receive map data to and from a local map cache 530. The local map cache 530 can include data associated with a local map of an area (e.g., the area travelled by the vehicle 502). Further, the map provider 520 can send data to the basemap data provider 510, which can then be sent to the vehicle 502.

The local coordinate frame provider 522 can send and/or receive data including vehicle map service data to and from the vehicle 502 and can include vehicle map service data associated with a local Cartesian frame near the vehicle 502. The local coordinate frame provider 522 can publish a continuously updated coordinated local reference frame by use of the rest of the system.

The dynamic data provider 524 can send and/or receive data including vehicle map service data associated with dynamic observations including location tracks, hazards, and/or traffic events (e.g., road closures). Further, the dynamic data provider 524 can exchange data with the dynamic data services 526 which can provide one or more services associated with the data provided to the dynamic data provider 524. Further, the dynamic data provider 524 can exchange data including the traffic data 528, which can include information associated with the state of traffic on one or more road segments (e.g., blocked intersections, the direction of the flow of vehicles through roadways, the velocity of traffic flow, the density of vehicle traffic, and/or the state of traffic signals at various roads).

In some embodiments, the vehicle 502 can include the in-vehicle sensor and reasoning system 505, the navigation system 506, the basemap data provider 510 522, the map data harvester 512, the map provider 520, the local coordinate frame provider 622, the dynamic data provider 524, and the local map cache 530. Furthermore, in some embodiments, the remote map service system 504 can include the data aggregation and anonymization system five fourteen, the map data 516, the communications manager 518, the dynamic data services 526, and the traffic data 528.

In alternative embodiments, the vehicle 502 and the remote map service system 504 can include different combinations of the in-vehicle sensor and reasoning system 505, the navigation system 506, the basemap data provider 510, the map data harvester 512, the data aggregation and anonymization system 514, the map data 516, the communications manager 518, the map provider 520, the local coordinate frame provider 522, the dynamic data provider 524, the dynamic data services 526 528, the traffic data 628, and/or the local map cache 530.

Figure 6:
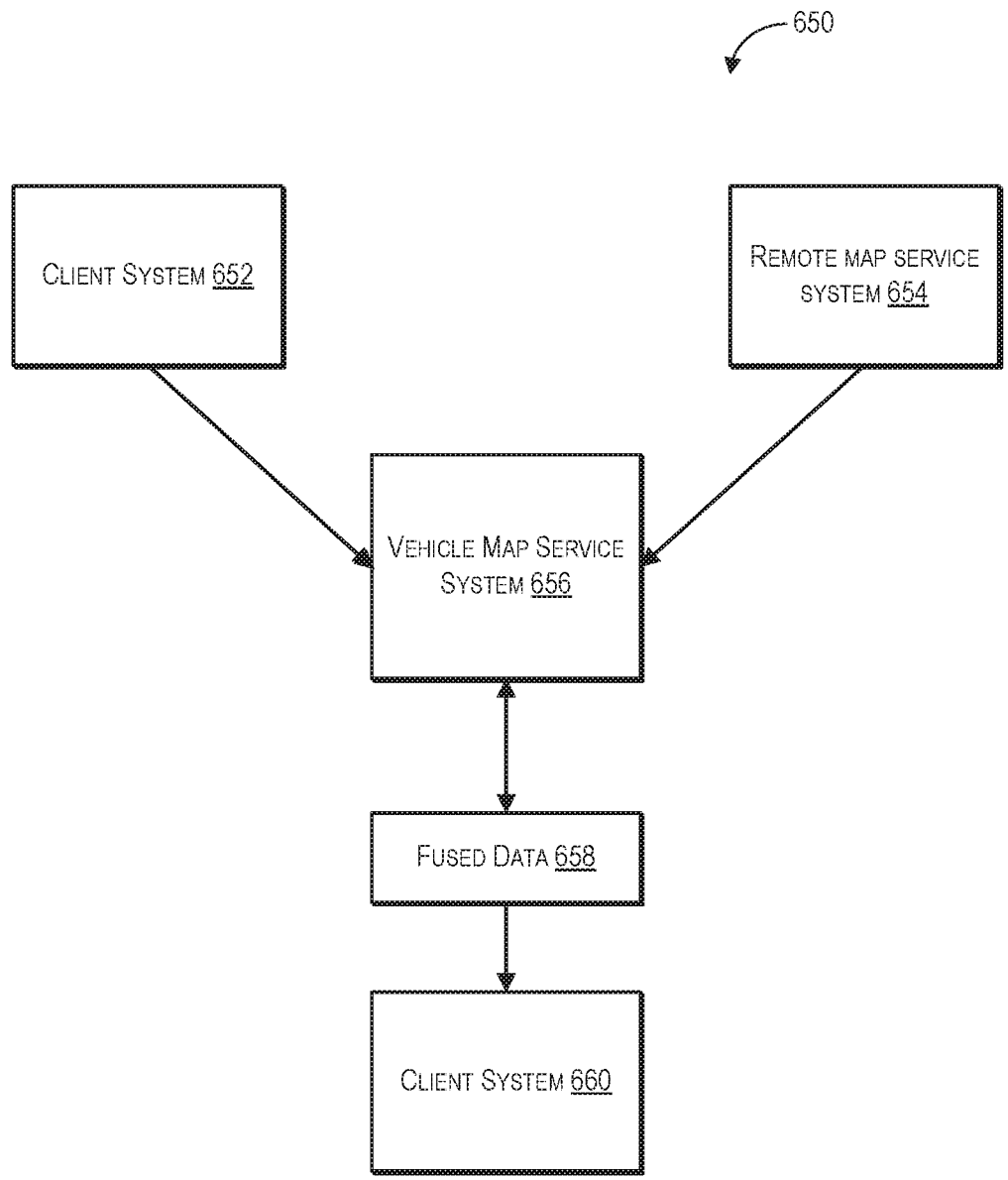
FIG. 6 depicts a block diagram of an example vehicle service system in accordance with example embodiments of the present disclosure.

FIG. 6 depicts a block diagram of an example vehicle service system according to example embodiments of the present disclosure. A computing system 650 includes a client system 652, a remote map service system 654, a vehicle map service system 656, fused data 658, and a client system 650.

The client system 652 can include one or more sensors that can detect one or more states of vehicle (e.g., the vehicle 110) and/or the environment external to the vehicle (e.g., the state of roads, vehicles, and buildings external to the vehicle 110). For example, the client system 602 can include one or more cameras, one or more LIDAR devices, one or more microphones, one or more radar devices and/or one or more sonar devices.

Furthermore, one or more sensors associated with the client system 652 can generate one or more sensor outputs that can be received by the vehicle map service system 906. For example, the client system 652 can include a camera located at the front center portion of a vehicle (e.g., the vehicle 110) that can generate sensor data including one or more images of the area visible to the camera. The one or more images can include images of a road sign at an intersection. The client system 652 can then send the sensor data to the vehicle map service system 656 which can be a computing system located in the same vehicle as the client system 652. The vehicle map service system 656 can determine, based at least in part on the sensor data received from the client system 652, that the road sign at the intersection indicates a school zone for a school that was recently opened in the area.

The remote map service system 654 can include a geographic information system service provider (e.g., the remote map service system 120) that can generate data (e.g., vehicle map service data) that can include one or more maps associated with the area in which the vehicle associated with the vehicle map service system 656 is present. Further, the remote map service system 654 can send vehicle map service data including the one or more maps of the area to the vehicle map service system 656. The vehicle map service data sent from the remote map service system 654 can include data associated with a school that is being constructed in the area based on satellite imagery received two weeks ago by the remote map service system 654.

The vehicle map service system 656 can fuse the sensor data received from the client system 652 and the vehicle map service data received from the remote map service system 654 into vehicle map service data that includes the fused data 658 which can include the information associated with the sensor data (e.g., the school zone information) from the client system 652 and the vehicle map service data including the satellite imagery of the area from the remote map service system 654. The vehicle map service data including the fused data can be included in the fused data 658 which is sent to the client system 660 which can be a remote computing device that can receive and/or distribute vehicle map service data. In some embodiments, the vehicle map service system 656 can send the fused data 658 to the remote map service system 654 which can update its maps with the new information about the school zone indicated in the sign detected by the client system 652.

Figure 7:
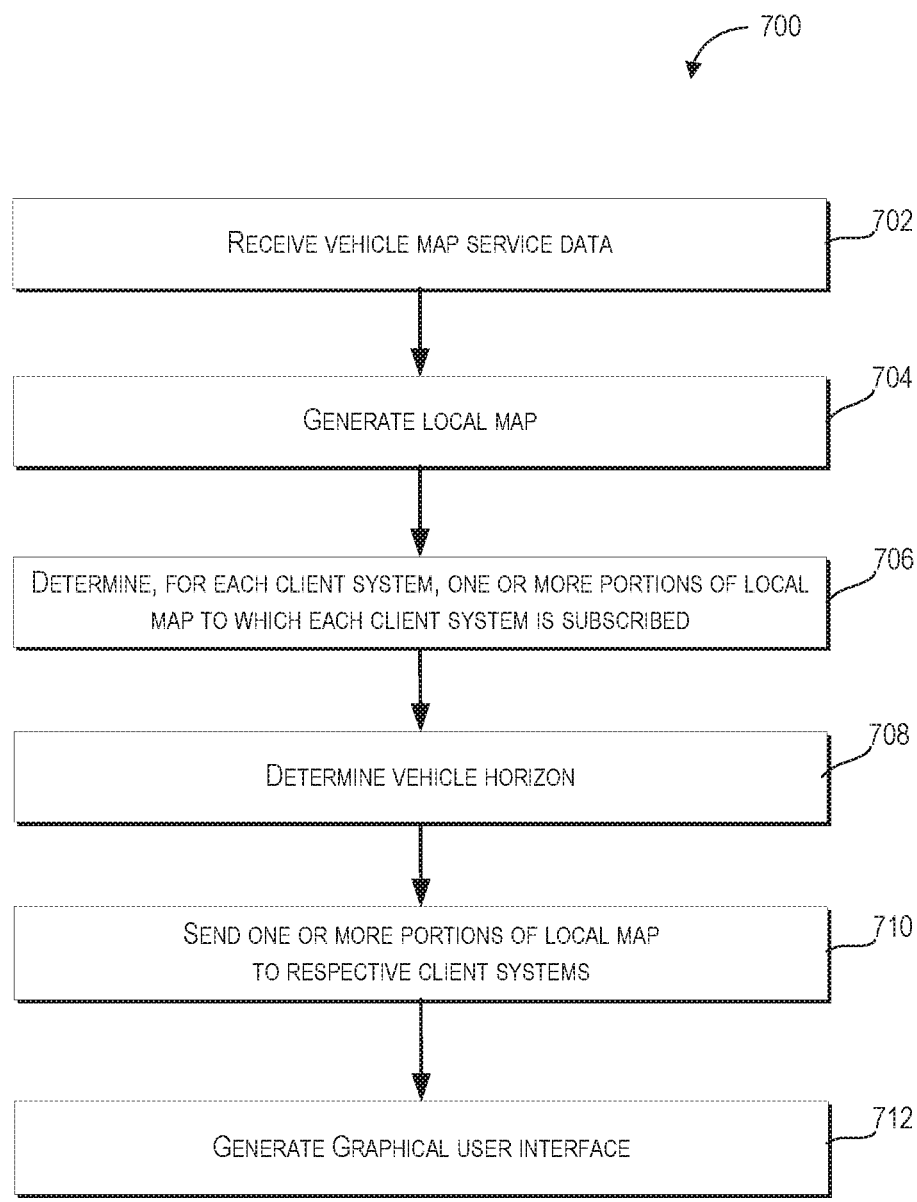
FIG. 7 depicts a flow diagram describing an example method of operating a vehicle map service system in accordance with example embodiments of the present disclosure.

FIG. 7 depicts a flow diagram describing an example method 700 of operating a vehicle map service system in accordance with example embodiments of the present disclosure. One or more portions of the method 700 can be executed or implemented on one or more computing devices or computing systems including, for example, the vehicle map service system 114, the remote map service system 120, and/or the remote vehicle service system 130. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include receiving vehicle map service data from at least one map service system. In some examples, the vehicle map service data can be received from a plurality of client systems of a vehicle map service system associated with a vehicle. For instance, vehicle map service data may be received from sensors, dashcams, and the like. In some examples, the vehicle map service data can be received from a plurality of service systems. For instance, the vehicle map service data can be received from a remote map service system, a remote client service system, and/or a vehicle map service system. The vehicle map service data can include information associated with a geographic area. For example, the vehicle map service system 114 can receive vehicle map service data via an internal interconnect of a vehicle map service client system or a communication network (e.g., a wireless or wired network including a LAN, WAN, or the Internet) through which one or more signals (e.g., electronic signals) and/or data can be sent or received.

In some embodiments, the vehicle map service data can be in accordance with a vehicle map service protocol associated with sending and/or receiving information between the plurality of service systems. For example, the vehicle map service protocol can specify one or more data formats or data rules associated with the vehicle map service data. Further, the vehicle map service protocol can specify a layering scheme for the vehicle map service data that can be used to control access to various portions of the vehicle map service data.

In some embodiments, the vehicle map service data can include a plurality of map layers. Each layer of the plurality of layers can be associated with one or more states, features, or characteristics of the geographic area. For example, different portions of the vehicle map service data associated with different aspects of the local map can be associated with different layers including layers associated with signs, vehicle location, and/or road attributes.

In some embodiments, each of the one or more portions of the vehicle map service data can be associated with a confidence value, probability envelope, and/or probability distribution indicative of the accuracy of the respective portion of the vehicle map service data. For example, the confidence value can include a numerical value in which a higher confidence value is correlated with a higher accuracy of the respective portion of the vehicle map service data.

Further, in some embodiments, the one or more states of the geographic area can be associated with a plurality of properties including a location of the vehicle (e.g., latitude, longitude, and/or altitude of the vehicle), one or more road segment locations, one or more lane locations, and/or one or more sign locations (e.g., a location of a sign and data associated with the type of sign).

In some embodiments, the vehicle map service data can include information associated with one or more sensor outputs of the plurality of client systems (e.g., sensor outputs from one or more vehicle sensors of the plurality of client systems including camera outputs, microphone outputs, and/or tactile sensor outputs), one or more maps provided by the plurality of service systems (e.g., one or more maps of an area traversed by the vehicle), and/or one or more machine-learned models provided by a plurality of service systems (e.g., one or more machine-learned models trained to detect and/or recognize one or more objects).

In some embodiments, the plurality of service systems can include one or more geographic information systems (e.g., the remote map service system 120) and/or one or more vehicle service systems (e.g., the vehicle map service system). The one or more geographic information systems can be associated with the vehicle map service data that includes one or more maps (e.g., one or more maps including indications of the identities and locations of road segments, lane markers, traffic signs, traffic signals, and/or landmarks). The one or more vehicle service systems can be associated with the vehicle map service data that includes information associated with the plurality of client systems (e.g., the state of client systems including navigation systems, in-vehicle graphical user interface systems, and/or vehicle communication systems).

Furthermore, in some embodiments receiving the vehicle map service data can include receiving, from the one or more geographic information systems, first vehicle map service data including one or more maps. Additionally, in some embodiments, receiving the vehicle map service data can include receiving, from the one or more vehicle map service systems, second vehicle map service data including information associated with the plurality of client systems.

At 704, the method 700 can include generating, based at least in part on the vehicle map service data, a local map of the geographic area within a vehicle horizon associated with a distance from the vehicle. In some embodiments, the vehicle horizon can be associated with a map of an area within a predetermined distance of the vehicle; a map of an area within a distance the vehicle can reach within a predetermined period of time; a map of an area within a predetermined distance or spatial relationship of the vehicle's current planned navigation path; and/or a map within a predetermined distance or spatial relationship of an alternate navigation path of the vehicle For example, the vehicle map service system 114 can receive vehicle map service data that can include one or more maps from service systems and one or more sensor outputs from different vehicle sensors associated with client systems. The multiple sensor outputs can be used to determine the location of the vehicle with respect to a landmark which can then be used together with the one or more maps to generate the local map which can include features and aspects of the different portions of the vehicle map service data.

In some embodiments, the local map can include a dynamic model of the geographic area surrounding the vehicle. The dynamic model can include a real-time location of the vehicle (e.g., the vehicle 110) in relation to one or more objects external to the vehicle. For example, the vehicle map service system 114 can generate a local map of the area that includes the current location of the vehicle and the current locations of other vehicles, cyclists, and/or pedestrians around the vehicle. Further, the dynamic model can include real-time indications of road closures, hazards, construction areas, and other types of events that can occur in an area.

At 706, the method 700 can include determining, for each client system (e.g., vehicle system) of the plurality of client systems, one or more portions of the local map to which each client system is subscribed. For example, the vehicle map service system 114 can receive vehicle map service data including subscription data from the plurality of client systems. The subscription data can include information associated with the one or more portions of the local map to which each of the plurality of client systems is subscribed. The one or more portions of the local map to which each of the plurality of client systems is subscribed can be based on information associated with a layer of the local map to which a client system is subscribed. For example, a vehicle navigation system can subscribe to layers of the vehicle map service data that are associated with displaying the location of the vehicle and objects within two kilometers of the vehicle. Other client system such as a dynamic data provider client of the vehicle map service system may subscribe to all layers.

At 708, the method 700 can include determining, a vehicle horizon based at least in part on a geographic location of the vehicle. The vehicle horizon can be associated with the one or more portions of local map provided to the vehicle client systems. Further, the vehicle horizon can be associated with an amount and/or rate of the vehicle map service data being provided to the plurality of client systems. For example, the vehicle map service system 114 can determine that the vehicle 110 is entering an area associated with a high level of signal interference or signal blockage that would reduce the amount of vehicle map service data that the vehicle can receive from remotely located service systems. Prior to entering the area, the vehicle can expand the vehicle horizon so that the vehicle can use vehicle map service data that has been stored when new vehicle map service data is not available from remote sources.

At 710, the method 700 can include sending the one or more portions of the local map to which each client system is subscribed to a respective client system of the plurality of client systems. For example, the vehicle map service system 114 can send one or more portions of the local map associated with current traffic conditions to a client system including a route planning system. The route planning system can be subscribed to the one or more portions of the vehicle map service data associated with the state of traffic (e.g., the location of roads in an area and/or the velocity, locations, and direction of travel of vehicles in that same area) and can receive the vehicle map service data associated with the state of traffic in an area on a continuous basis.

At 712, the method 700 can include generating a graphical user interface associated with the local map. The graphical user interface can display the local map using one or more symbols including text or images (e.g., a combination of text or graphics that can display representations of data, including the vehicle map service data, to a user of the software application. Further, the graphical user interface component can be generated on a computing device (e.g., an in-vehicle display device) with a physical interface that can receive input (e.g., touch input and/or voice input) from a user to view various portions of the local map and/or representations of the vehicle map service data. Additionally, the graphical user interface component can receive inputs (e.g., user inputs) in order to send, receive, generate, modify, and/or process data associated with the local map and/or the vehicle map service data. By way of example, the vehicle map service system 114 can generate a graphical user interface that is displayed on a display device of the vehicle 110.

In example embodiments, unrefined and/or inconsistent observations can be combined meaningfully into a more refined and more consistent set of observations. For instance, a complete map may be considered to be a collection of consistent observations which may be received from a plurality of sources, including multiple sensors of multiple vehicles, various basemap sources, and any number of fused representations of entities defined in the map as a representation of map features, sources, etc. A recursive application of such a process can be used to steadily progress towards and maintain a fully refined and consistent map in example embodiments.

Figure 8:
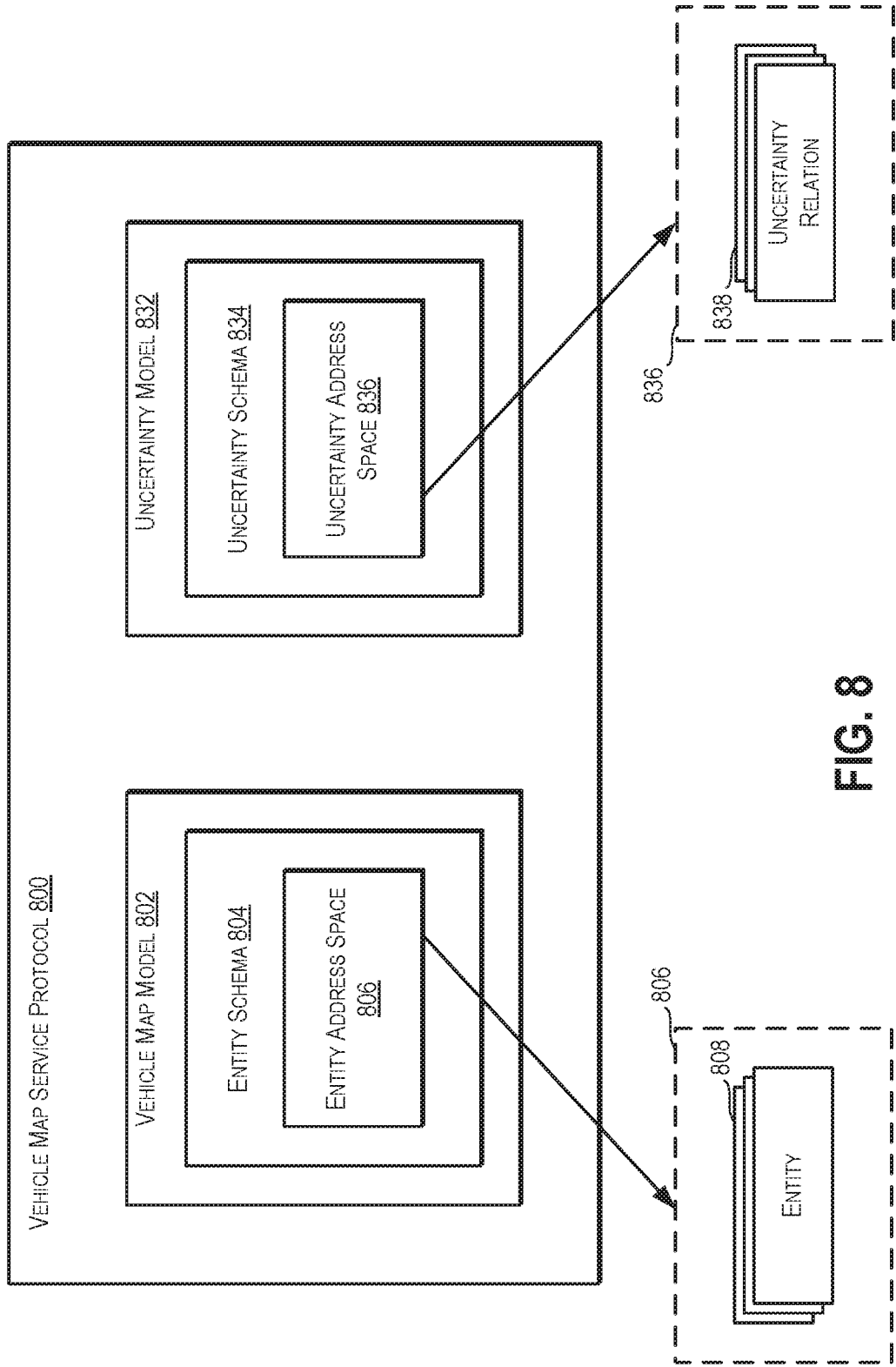
FIG. 8 depicts a block diagram illustrating an example of a vehicle map service protocol defining a vehicle map model and an uncertainty model in accordance with example embodiments of the present disclosure.

FIG. 8 depicts a block diagram illustrating an example vehicle map service protocol 800 in accordance with example embodiments of the present disclosure. Vehicle map service protocol 800 can be implemented by any of the computing devices described herein to provide vehicle map service data including map data and uncertainty data in accordance with a vehicle map service. Vehicle map service protocol 800 includes a vehicle map model 802 and a separate uncertainty model 832. Vehicle map model 802 can include object records that hold mean or estimate (e.g., best estimate) values for entit(ies) 808 and their properties, while uncertainty model 832 provides an external model including uncertainty relation(s) 838 (e.g., external records) that reference the base object records of vehicle map model 802. In some examples, the external records of the uncertainty model can effectively add "fuzz" like variance terms to the mean values of the object records of vehicle map model 802.

Vehicle map model 802 includes an entity schema 804 which includes an entity address space 806. The separate uncertainty model 832 includes an uncertainty schema 834 which includes an uncertainty address space 836. In this manner, uncertainty model 832 provides a schema of uncertainty relations that is separate from the entity schema of the vehicle map model 802. In some examples, the entity schema can represent an entity 808 as an estimate (also referred to as "best guess") of its properties on the map. The uncertainty schema 834 can include a separate uncertainty address space 836 of uncertainty relations 838. The uncertainty schema 834 can point to entities in the entity address space 806, and can relate entities within the entity address space 806.

In accordance with example embodiments of the present disclosure, an uncertainty model may provide an extensible uncertainty relation schema. For example, an uncertainty relation between two single real-valued properties of a single entity may be an arbitrary probability density function. Consider a multiplication of that arbitrary function by the fact that such a function may also have independent cross correlation functions with every single other property of that entity, or any other entity. The set of possible relations grows as the square of the number of properties in the entire model, where the model itself could be composed of an arbitrary number of hypothesized states of the same real-world entity.

In example embodiments, uncertainty model 832 can be selected for modeling uncertainty in entity properties using an extensible uncertainty relation schema. In example embodiments, uncertainty model 832 can expand by adding new uncertainty models to the schema as it evolves. In this way, a concept of some generally useful uncertainty relations (like joint gaussian envelopes between poses) can be provided, and in situations where higher precision may be desired, more sophisticated special-purpose relations may be added to the schema. Such an approach can provide improvements over modelling uncertainty in entity properties by selecting one useful model (e.g., a gaussian or some form of a joint gaussian) and forcing uncertainties into that model (e.g. an arbitrary probability mass function can be converted into a gaussian by taking a mean and variance, then substituting a gaussian with that mean and variance). Such an approach can provide improvements over providing a small set of highly specific models that can be selected and are custom to the particular use case. For example, a specific uncertainty model for "sign observations of a car" may specify the make and model of the car, for which an arbitrarily complex model can be defined that is particular to each make and model. For example, a model for a sign observation may specify a particular form of LIDAR that captured the sign, where one uncertainty property is the cross correlation between the reflectivity property of the sign, or the angle of the sign to the beam source, and the variance of the distance measurement.

In example embodiments, uncertainty model 832 can adapt and grow with the addition of new uncertainty models to the schema as it evolves. In this way, general uncertainty relations can be provided for simple situations, and more sophisticated special-purpose relations may be added to the schema in situations where higher precision may be desired.

In accordance with example embodiments, uncertainty relations and confidence data may be provided independently from the entity schema 804. For example, some client devices may not receive the full uncertainty model of every aspect of the map. Some client devices of a map, for example, may choose to receive the current, fully coherent unique entity map that shows the highest probability projection of the uncertain map into a self-consistent map with no uncertainty at all. Other client devices may choose to receive uncertainty information. Some individual client devices may choose to receive specific types of uncertainty, while other individual client devices may not. For example, some client devices may choose to receive only the highest likelihood hypothesis of the position of the vehicle, but may still want an error envelope around that single highest likelihood hypothesis. Some applications may be able to utilize or incorporate every possible uncertainty mass function between every possible hypothesized property value of every possible hypothesized entity. A map database of the vehicle map service can contain all of the uncertainty information that individual client devices may select to receive, and not require clients to digest all of the uncertainty information all of the time.

Accordingly, in some example embodiments, the vehicle map service may provide an uncertainty model where the uncertainty relations are separable from the base map itself, as represented by the map model and the entity schema. For example, a set of objects with definite properties can be provided using an entity schema of the map model. Uncertainty relations, however, can be added and understood or not understood by a particular client depending on which uncertainty relations they elect to receive or otherwise deal with. These uncertainty relations can be specified using the uncertainty model and the uncertainty address space that is separate from the entity address space of the map model.

In some aspects, representations of shared context may be provided. A shared context in which observations are taken may be tracked. For example, the fact that N sign observations are all made from one image or one vehicle pose at the same moment can be tracked. A set of implied uncertainty relations may be inferred, which may be helpful in clustering and fusion. For example, it may be known that those observations should be to different signs, and known that the relative accuracy between those observations is independent of the precise vehicle pose at that moment, even though the absolute accuracy is intermediated by the vehicle pose).

In some examples, vehicle map service protocol 800 can provide full observation expressibility to other systems. Uncertainty models may be used to extract observations of features with uncertainty to a geographic information service provider such as a remote map service system in order to update a basemap. For example, a geographic information system may be provided a model of fully formed observations of the entities that it supports. In accordance with example embodiments of the present disclosure, uncertainty information can be added via an external record that points back to the primary record containing the mean value.

Example embodiments may use external modeling, where object records hold only the mean or estimated concrete values for entities and their properties, and uncertainty models are purely external records that reference the base object records, effectively adding "fuzz" like variance terms to the mean values. This is in service to several desirable properties such as independence and extensibility.

In accordance with example embodiments of the present disclosure, data indicative of relative accuracy may be provided. In example embodiments, a model may represent relative accuracy (e.g. "these segments are 3 meters apart to within 0.1 cm"). In example embodiments, a model may represent relative accuracy to the earth as a map feature (e.g. "this sign is at lat X lon Y with an error envelope with respect to the earth"). In this manner, all error relations may be considered relative. For example, what some may call an absolute accuracy may really be accuracy with respect to the earth itself as an entity. Thus, in one embodiment, a model may be a relative model with a few specially defined entities (e.g. the earth, vehicle X pose at time T, the state-plane coordinate origin of Texas, etc.).

According to some aspects, vehicle location can be modeled using a vehicle map model and uncertainty model. A vehicle location can be modelled statistically using a particle filter approach in some examples. For instance, at any moment in time, the probabilistic map of vehicle locations may involve a plurality of hypotheses of the vehicle state. For example, the vehicle state may contain a hypothesized pose and velocity in an earth-based (e.g., WGS84) coordinate space. Global coordinates can use the world geodetic system, referencing the world geodetic system 1984 (WGS84) standard. Using the world geodetic system, coordinates can be described by latitude, longitude, and altitude. Altitude can be referenced according to the Geoid as a distance above sea level, in the direction normal to the WGS84 ellipsoid. Other coordinate systems can be used. In some embodiments, the vehicle map service protocol can describe positions and/or geometry in local coordinates (e.g., Cartesian coordinates). The local coordinates can be less complex and more compact than global coordinates. However, in some implementations, determining local coordinates may include the use of a global reference.

The vehicle state may contain variances and covariances for pose and velocity (e.g., a joint gaussian model) or other joint probability models. The vehicle state may contain a measure of confidence that an observation is a correct hypothesis, for example, which can be interpreted as the probability mass function of the joint gaussian for pose. Such confidences can be scaled to add to 1.0 over all hypotheses in some examples. A single state of the vehicle can be provided to some clients, such as to client devices that only request a single best observation without uncertainty information. For example, the mean value of the most likely hypothesis, for example by confidence, may be given.

In some examples, a full description of the observation models from a geographic information tracking system and from standard particle filter models of all observed entities may be provided, such as by harvesting. The characteristics can be modeled in a geographic information tracking system's observation protocol.

According to example embodiments, general individual feature detection and fusing may be provided. Many features can be modeled as an entity with a single concrete pose (e.g., buildings, street signs, placards and billboards, streetlights, mailboxes, lampposts, other vehicles, incidents, etc.) that may typically be detected from single sensor images (of various types of sensors). In general, these observations may be similar in nature to sign observations as described. In example embodiments, pose uncertainty may be modeled, including cross correlations between elements of pose and potential correlations between elements of pose and other properties. In some implementations, uncertainty in physical properties and/or state of the feature may be modeled, including relative probability and mutual exclusion between states from different sensors. In example embodiments, uncertainty and confidence may be modeled. The uncertainty and confidence can be between basic observations which may be clustered (e.g. for other vehicles, what is the likelihood that two observations of a vehicle from different sensors is the same vehicle).

In accordance with example aspects, linear feature (e.g., lane stripes, curbs, etc.) detection and fusing are provided. Some features such as linear road marking features like lane stripes and curbs, large scale "features" like traffic and weather, etc., may be fundamentally long linear extrusions. In some cases, a single sensor image may not capture a feature in its entirety. Thus, partial probabilistic road maps may include partial, local models of pieces of roads and lanes. These partial local models can be fused into larger sections when creating a primary map, and partial road sections may be conflated with larger basemaps in order to identify and encode deltas that can be returned to the remote map service system as change detections.

In some instances, reporting of detections of physical features such as stripe sections which are not present in a prior map can be provided. In some examples, detections may involve classification of type, color, or other identifying properties of the feature. In some examples, the detections may involve error properties with respect to the vehicle frame and/or the oriented feature. For example, uncertainty in stripe width, distance from vehicle, or orientation with respect to vehicle can be provided. Additionally or alternatively, variances and cross-correlations between physical properties (e.g., pose, width, etc.) can be provided. In some examples, the detections may involve confidence in the classifications of properties of a feature. In some examples, the detections may involve relative uncertainty and joint existence in measurements taken in a single sensor context. For example, uncertainty in spacing between features from a particular detection can be provided. Identifying multiple features that are mutually exclusive from being detected in the same image can be provided.

In some examples, complex graph relations and fusion can be provided. These complex graph relations may be correlated to identify, for example, that an intersection has been observed in the middle of a road segment that previously did not have an intersection. In example embodiments, the complex graph relations may be correlated to identify complex likelihood relations of connections. For example, an identification can be made of which stripes are likely to connect to which other stripes, or which stripes are likely the same stripe as other stripes. In example embodiments, the complex graph relations may be correlated to identify a likelihood of which point features (e.g., signs, lights, barriers) are associated with which road or lane elements (e.g., a sign between a highway and frontage road).

Figure 9:
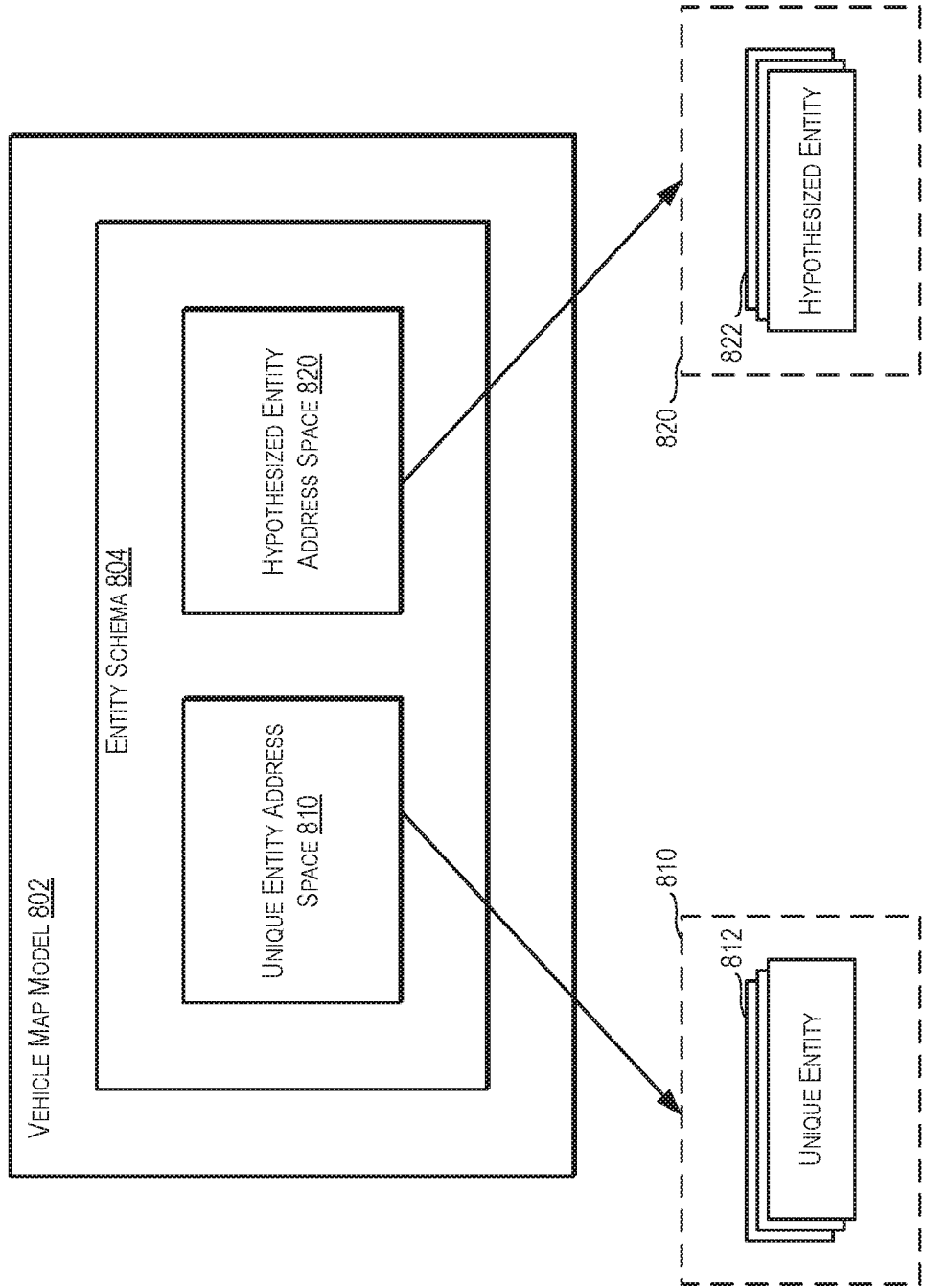
FIG. 9 depicts a block diagram of an example vehicle map model according to example embodiments of the present disclosure.

FIG. 9 depicts a block diagram illustrating additional details of a vehicle map service protocol in accordance with example embodiments of the present disclosure. As depicted in FIG. 9, an entity address space of entity schema 804 can include two separate address spaces. In particular, an entity address space of entity schema 804 can include a unique entity address space 810 and a hypothesized entity address space 820. In this manner, the vehicle map model can be considered to be an address space containing base entities which are divided into two groups. Unique entities 812 can be considered to be a current estimate or best guess representations of an existing object that is unique among other unique entities. Hypothesized entities 822 can be considered a non-unique entity which is not guaranteed to be unique among unique entities or hypothesized entities. The hypothesized entities may lack uniqueness among the plurality of unique entities and the plurality of hypothesized entities.

Utilizing vehicle map model 802, a client device which is interested in just the estimate or best guess map may consider only the unique entities 812. By contrast, a client device which is interested in all possible entity hypotheses can consider the hypothesized entities 822 in hypothesized entity address space 820 in addition to the unique entity address space 810.

Accordingly, the uncertainty schema 834 can point to entities in the unique entity address space 810 of unique entities or the hypothesized entity address space 820 of hypothesized entities. Additionally, the uncertainty schema 834 can relate unique entities within the unique entity address space 810 and/or can relate hypothesized entities within the hypothesized entity address space 820. Moreover, the uncertainty schema 834 can relate unique entities and hypothesized entities between the unique entity address space 810 and the hypothesized entity address space 820.

Figure 10:
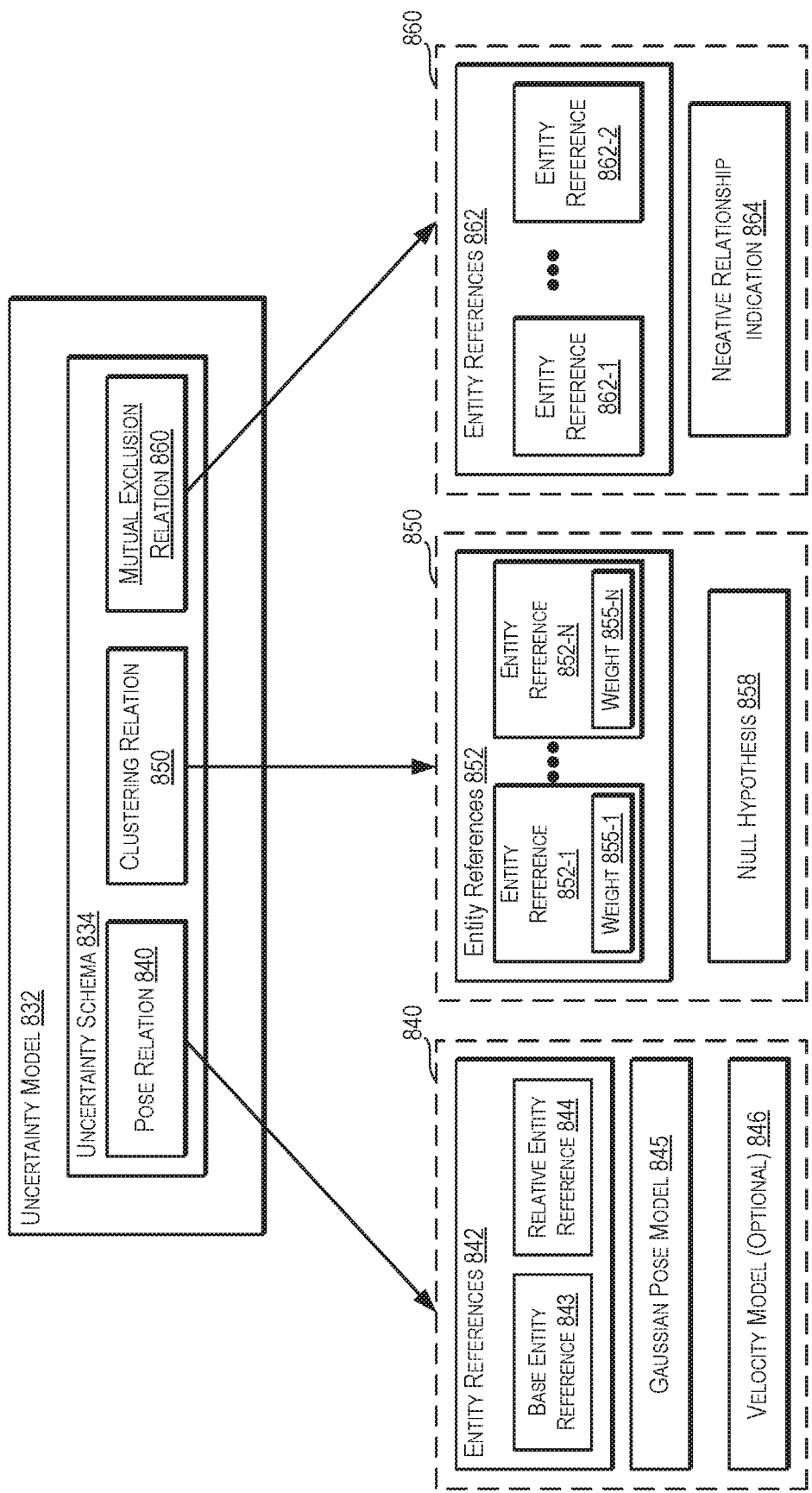
FIG. 10 depicts a block diagram of an example uncertainty model according to example embodiments of the present disclosure.

FIG. 10 depicts a block diagram illustrating additional details of uncertainty model 832 in accordance with example embodiments of the present disclosure. As depicted in FIG. 10, uncertainty schema 834 (including uncertainty address space 836) can be utilized to define a pose relation 840, a clustering relation 850, and/or a mutual exclusion relation 860 in association with one or more entities of a vehicle map model 802 in accordance with example embodiments of the present disclosure. It is noted that while a single pose relation 840, a single clustering relation 850, and a single mutual exclusion relation 860 are depicted, multiple uncertainty relations may be provided in accordance with example embodiments.

In example embodiments, pose relation 840 can reference a single, rigid entity whose pose can be described by a single 6DOF base frame, providing a joint gaussian model on X, Y, Z, and angle, with covariances explicitly represented. The pose relation may be similar to an observation in some geographic information tracking systems. In example embodiments, a pose relation may contain entity references 842 to more than one entity. For example, a base entity reference 843 may reference a base entity. A relative entity reference 844, whose pose is uncertain with respect to the base entity, may reference a relative entity. The base entity may be an entity that is held constant and thereby establishes the origin of the local coordinate frame. For instance, the base entity may include another entity in the model. Examples of base entities include a vehicle location for vehicle-relative measurements, and/or EARTH, which bases the uncertainty in ECEF (or other earth-fixed) coordinates. For instance, the relative entity pose may be uncertain with respect to the base entity. In example embodiments, a pose relation may contain a Gaussian pose model 845 (e.g. mean and variances for coordinate values). Additionally and/or alternatively, the mean may be left off if the relative entity's pose is already described with respect to the base entity. For example, the relative entity's pose can be presumed to be already set to the mean in some examples. In example embodiments, a pose relation may contain a velocity model 846 of the velocity vector and/or tensor of the relative entity with respect to the base entity. The velocity model 19 846 46 is optional.

In example embodiments, a pose relation 840 may be reversible. For example, if the base entity is a vehicle pose and the relative entity is a sign, then one could reverse the envelope to get the uncertainty in the vehicle pose with respect to the sign with the sign's pose held fixed.

A pose relation can be expected to be a very common and highly useful relation, as joint gaussian models are often the standby for point-to-point relations, and many uncertainties attempt to model relative pose uncertainty between rigid objects. In some examples, a pose relation may utilize a concrete definition in each referenced entity. A field within the referenced entity can represent the pose as affected by the pose relation. Use of a relation context may be useful when the relation is derived from a specific observation. In example embodiments, a pose relation may be derived from a specific observation. For example, the relation may be derived from a sign (e.g. sign to vehicle, sign to EARTH, etc.), or from a vehicle location, (e.g. vehicle to EARTH, etc.).

In example embodiments, clustering relation 850 (also referred to as a confidence relation) may address the situation of having a cluster of hypotheses for the existence and/or property state of a particular real-world entity. The confidence relation may include entity references 852 which reference two or more hypotheses which are taken to be the same entity. Entity references 852 include any number of entity references 852-1 through 852. The confidence relation can optionally assign a weight 855-1 to 852-N to entity references 852-1 to 852-N, respectively, if relative weights are known. This confidence relation may include an implicit "null hypothesis" 858 that none of the referenced concrete hypotheses are correct.

In example embodiments, if weights are included, then each hypothesized entity may have a weight associated with it. In some examples, if used in a unary fashion, with a single concrete hypothesis and weight for the concrete hypothesis and the null hypothesis, this can represent a simple confidence that the feature exists with the probability of the ratio of the weights. In example embodiments, if used with multiple concrete hypotheses, this can represent a cluster of hypotheses of the properties of the same entity. For example, multiple hypothesized entities may be clustered as observations of a particular real entity, with or without knowledge of the relative probability that each observation is the true state of the entity. With weights and pose uncertainty relations on each entity, this may represent a sign observation cluster, or a particle filter model of the vehicle position.

In example embodiments, a mutual exclusion relation 860 can reference multiple hypothesized entities. A mutual exclusion relation 860 may relate to multiple hypothesized entities and thus include two or more entity references 862-1 to 862-N which reference hypothesized entities and indicate that the two or more hypothesized entities are not a same real-world entity. In some examples, a mutual exclusion relation may state a negative. For instance, a mutual exclusion relation may indicate that two or more hypothesized entities cannot be hypotheses of the same real-world entity. Accordingly, mutual exclusion relation 860 may include a negative relationship indication 864 that is indicative of a shared context. In some examples, a mutual exclusion relation may be used to relate observations of a similar type (e.g. sign, vehicle, etc.) that were made from the same image and are thus known to be different real entities. In some cases, a confidence relation between entities can indicate fundamentally that multiple hypotheses are of the same real-world entity. By contrast, a mutual exclusion relation can indicate fundamentally that multiple hypotheses are of different entities. The mutual exclusion relation can explicitly represent a constraint implied by a shared context in some examples. In example embodiments, where the confidence relation indicates fundamentally that "these hypotheses are of the same real entity," the mutual exclusion relation may indicate fundamentally that "these hypotheses are of different entities." In example embodiments, the intent of a mutual exclusion relation may be to explicitly represent one of the constraints implied by shared context. For example, all sign observations taken from a single image may be related with a mutual exclusion relation, as they do not represent the same real-world sign.

Figure 11:
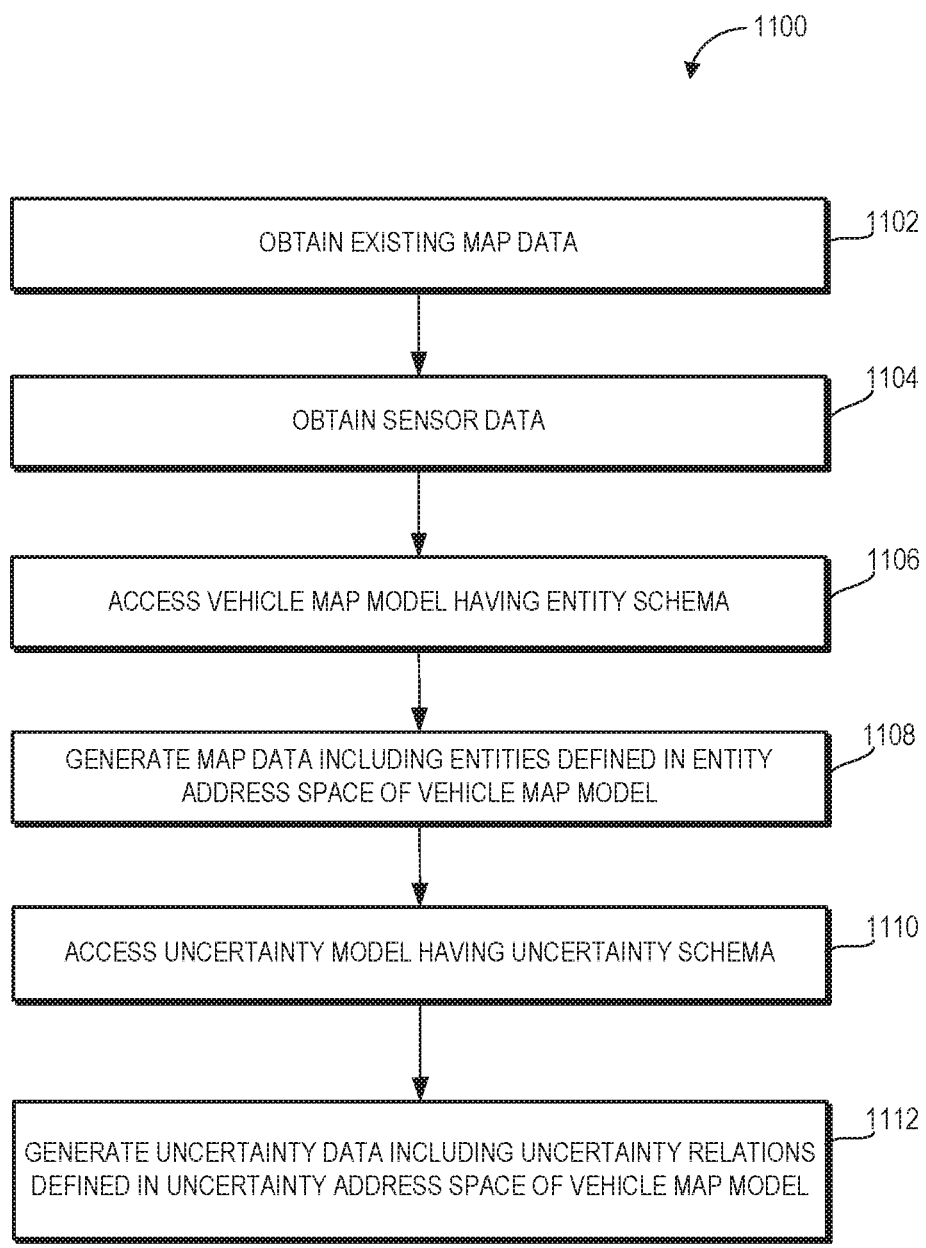
FIG. 11 depicts a flow diagram describing an example method of generating vehicle map service data in accordance with example embodiments of the present disclosure.

FIG. 11 depicts a flow diagram describing an example method 1100 of operating a vehicle map service system in accordance with example embodiments of the present disclosure. One or more portions of the method 1100 can be executed or implemented on one or more computing devices or computing systems including, for example, the vehicle map service system 114, the remote map service system 120, and/or the remote vehicle service system 130. Further, one or more portions of the method 1100 can be executed or implemented as an algorithm on the hardware devices or systems disclosed herein to, for example, generating vehicle map service data including map data and uncertainty data. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, method 1100 can include obtaining map data, such as map data 124, map data 134, and/or map data at vehicle 110. It is noted that 1102 is optional, as method 1100 may be utilized to generate map data from sensor data or other sources without obtaining existing map data. The map data can be associated with the state of a geographic area (e.g., one or more maps).

At 1104, method 1100 can include obtaining sensor data, such as sensor data 126, sensor data 136, and/or sensor data at vehicle 110. Sensor data can be obtained from one or more sensors at a vehicle 110 in example embodiments. For example, sensor data may include LIDAR data, RADAR data, image data, or other sensor data obtained from one or more LIDAR sensors, RADAR sensors, image sensor (e.g., cameras), etc. of a vehicle.

At 1106, method 1100 can include accessing a vehicle map model having an entity schema. The vehicle map model can be configured to provide map data for a geographic area in association with the vehicle mapping service. The vehicle map model can include a first address space that is configured represent entities associated with the vehicle map model.

At 1108, method 1100 can include generating map data including entities defined in the entity address space of the vehicle map model. The entities can be generated according to an entity schema of the vehicle map model.

At 1110, method 1100 can include accessing an uncertainty model having an uncertainty schema. The uncertainty model can be configured to represent a plurality of uncertainties associated with the entities generated using the vehicle map model. The uncertainty model can include a second address space that is separate from the first address space.

At 1112, method 1100 can include generating uncertainty data including uncertainty relations defined in the uncertainty address space of the vehicle map model. The uncertainty relations can be defined generated with respect to one or more of the entities defined in the first address space. The one or more uncertainty relations can be defined in the uncertainty address space according to the uncertainty schema of the uncertainty model.

Figure 12:
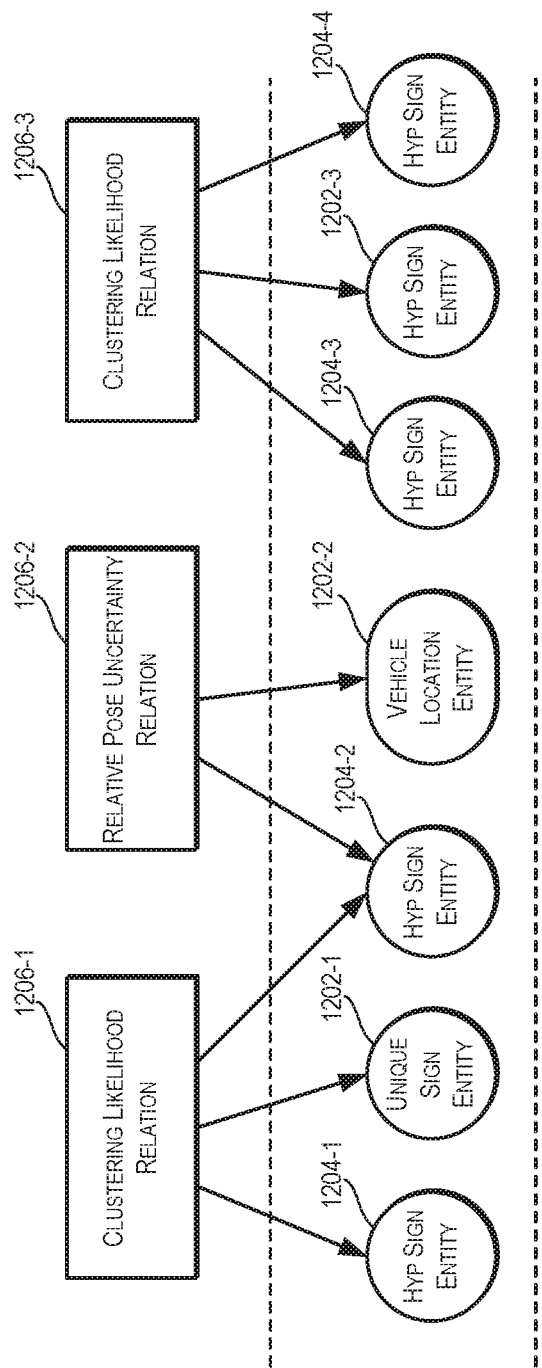
FIG. 12 depicts a block diagram of example vehicle map service data including entities defined according an entity schema of a vehicle map model and uncertainty relations defined according to an uncertainty schema of an uncertainty model in accordance with example embodiments of the present disclosure.

FIG. 12 depicts a block diagram of example vehicle map service data including a vehicle map model and uncertainty model in accordance with example embodiments of the present disclosure. The vehicle map model includes entities defined according to an entity schema of the vehicle map model and uncertainty relations defined according to an uncertainty schema of the uncertainty model in accordance with example embodiments of present disclosure. FIG. 12 depicts one example of layers of uncertainty modeling for a set of street signs on a map. In example embodiments, the uncertainty relations can be provided in a manner such that they are separable from the base map itself. The simplest view may be of a set of objects with definite properties. From the set of objects with definite properties, uncertainty relations may be added and understood or not understood by a particular client device depending on which relations they can process.

An extrinsic model, where there is an uncertainty schema of uncertainty relations that is separate from the entity schema is provided. The entity schema represents an entity as an estimate (also referred to as "best guess" or surmisal) of its properties on the map. The vehicle map model includes an entity address space containing base entities, divided into two groups: unique entities which are considered to be a current estimate of an existing object that is unique among other unique entities, and hypothesized entities which are not guaranteed to be unique among unique entities or hypothesized entities. In example embodiments, a client device which is interested in just a map of unique entities representing the current best estimation by the system can consider only unique entities. In example embodiments, a client device which is interested in all possible entity hypotheses can consider the address space of both unique entities and hypothesized entities. In example embodiments, the entity address space can correspond to a fused entity layer, and the hypothesized entity space can correspond to a set of non-fused, intermediate layers. In some implementations, the uncertainty address space can be a space of entities belonging to a separate uncertainty model layer of a vehicle map service schema or protocol.

In FIG. 12, unique entities include a first unique sign entity 802-1, a unique vehicle location entity 802-2, and a second unique sign entity 802-3. The unique entities can represent the highest likelihood hypothesis for each possible entity such as a sign or vehicle location. The properties of the unique entities can contain properties like pose containing concrete, single values. A simple client or other client made access or simply see the highest likelihood hypothesis for each possible sign or vehicle location represented by a unique entity.

Hypothetical entities include a first hypothetical sign entity 1204-1, a second hypothetical sign entity 1204-2, a third hypothetical sign entity 1204-3, and a fourth hypothetical sign entity 1204-4. Hypothetical entities may represent an entire set of possible hypothesized signs, which may represent the same actual real-world entity seen from different sensors or other sources. Some clients such as more sophisticated clients may elect or otherwise see the entire set of possible hypothesized signs.

The vehicle map data depicted in FIG. 12 additionally includes a set of uncertainty relations. The uncertainty relations can describe error envelopes around the poses of the individual hypotheses in some examples. Additionally or alternatively, the uncertainty relations can describe relative uncertainty/confidence/conditional existence information about a subset of hypotheses that may represent the same physical sign or vehicle location. In the example of FIG. 12, the uncertainty relations include a clustering likelihood relation 1206-1 which may represent a clustering likelihood relation between the first unique sign entity 1202-1, the first hypothetical sign entity 1204-1, and the second hypothetical sign entity 1204-2. The clustering likelihood relation 1206-1 is one example of a clustering relation 850 illustrated in FIG. 10. A second uncertainty relation includes a relative pose uncertainty relation 1206-2. Relative pose uncertainty relation 1206-2 can represent a relative pose uncertainty relationship between the second hypothetical sign entity 1204-2 and the unique vehicle location entity 12802-2. The relative pose uncertainty relation 1206-2 is one example of a pose relation 840 illustrated in FIG. 10. A third uncertainty relation 1206 includes a clustering likelihood relation 1206-3. The clustering likelihood relation 1206-3 is one example of a clustering relation 850 illustrated in FIG. 10. Clustering likelihood relation 1206-3 may represent a clustering likelihood relation between the third hypothetical sign entity 1204-3, the second unique sign entity 1202-3, and the fourth hypothetical sign entity 1204-4.

A subset of client devices, such as more sophisticated client devices, may also obtain or otherwise see the uncertainty relations that describe error envelopes around the poses of the individual hypotheses, or relative certainty/confidence/conditional existence information about subsets of hypotheses that may represent the same physical sign.

In example embodiments, if an uncertainty is in the properties of a single entity, then one or more external uncertainty relations can point to that entity's properties, describing error functions on or between properties of the entity. For example, a sign may have a 3D position in the world. An uncertainty relation can reference a position field of the sign, providing variances and covariances between coordinates describing a joint gaussian envelope on the X, Y, Z coordinates of the sign with respect to EARTH. For example, an earth-centered, earth-fixed (ECEF) coordinate system, or a specified fixed frame in ECEF can be used. Consider an example sign that may be associated with road X, but for which there may be reason to believe that the sign might be associated with roads Y or Z. An uncertainty relation may point to a "belongs_to_segment" field of the entity and include a joint distribution that gives a probability distribution. For instance: P percent confidence in road X, Q percent confidence in road Y, R percent confidence in road Z.

In example embodiments, uncertainty relations may associate properties of multiple entities. For example, consider two signs S1 and S2 that may be observed in a same LIDAR scan. One uncertainty relation may reference the two signs' positions, mirroring the same basic joint gaussian position error model, but instead of relating it to EARTH, it may relate to the mean coordinate of the other sign. Another uncertainty relation may state that the two hypothesized entities may be jointly observed in the same context, thus indicating they are almost certainly different signs (used in clustering). For example, two sign observations S1 and S2 may be both described as having a joint gaussian position error with respect to a vehicle observation entity V1. This may indicate that the error is strictly within the local frame of that vehicle pose.

Thus, if S1 and S2 are taken from the same camera image, they also have a joint context relation as per above. If S1 is taken from LIDAR and S2 is taken from video, however, they have no joint context relation, as they may be the same sign. V1 itself may have a joint gaussian uncertainty relation with respect to EARTH; this is uncertainty in its pose. A derived relation may be inferred by combining either sign relation S1 to V1 and V1 to EARTH to derive a (less accurate) model of the sign's position with respect to the earth.

In example embodiments, in addition to relating the joint probability models of parameters, the relations can also model the joint existence relations between hypotheses. For example, for a vehicle map match case, there may be three vehicle position hypotheses V1, V2, and V3, each of which may have its own pose and its own position uncertainty relation relating each to EARTH. There may also be a relation on V1, V2, and V3 as per the above relation stating that they are mutually exclusive hypotheses about the same vehicle with probabilities P, Q, and R associated with each. This then can represent a full particle filter model of the vehicle position.

By way of example, consider an example of sign entities that have a confidence value associated with them as provided by the vehicle map model. The uncertainty model can define a pose relation 840 entity for each sign that references the sign's position. In a further example, each sign can have a confidence and the pose property of the sign can have an uncertainty envelope provided by the vehicle map model.

The uncertainty model can define a pose relation 840 entity for each sign that references that sign. Additionally, a clustering relation 850 can be defined that references each sign, with a weight associated with each sign that describe the relative probabilities of that sign being the actual real world sign.

Figure 13:
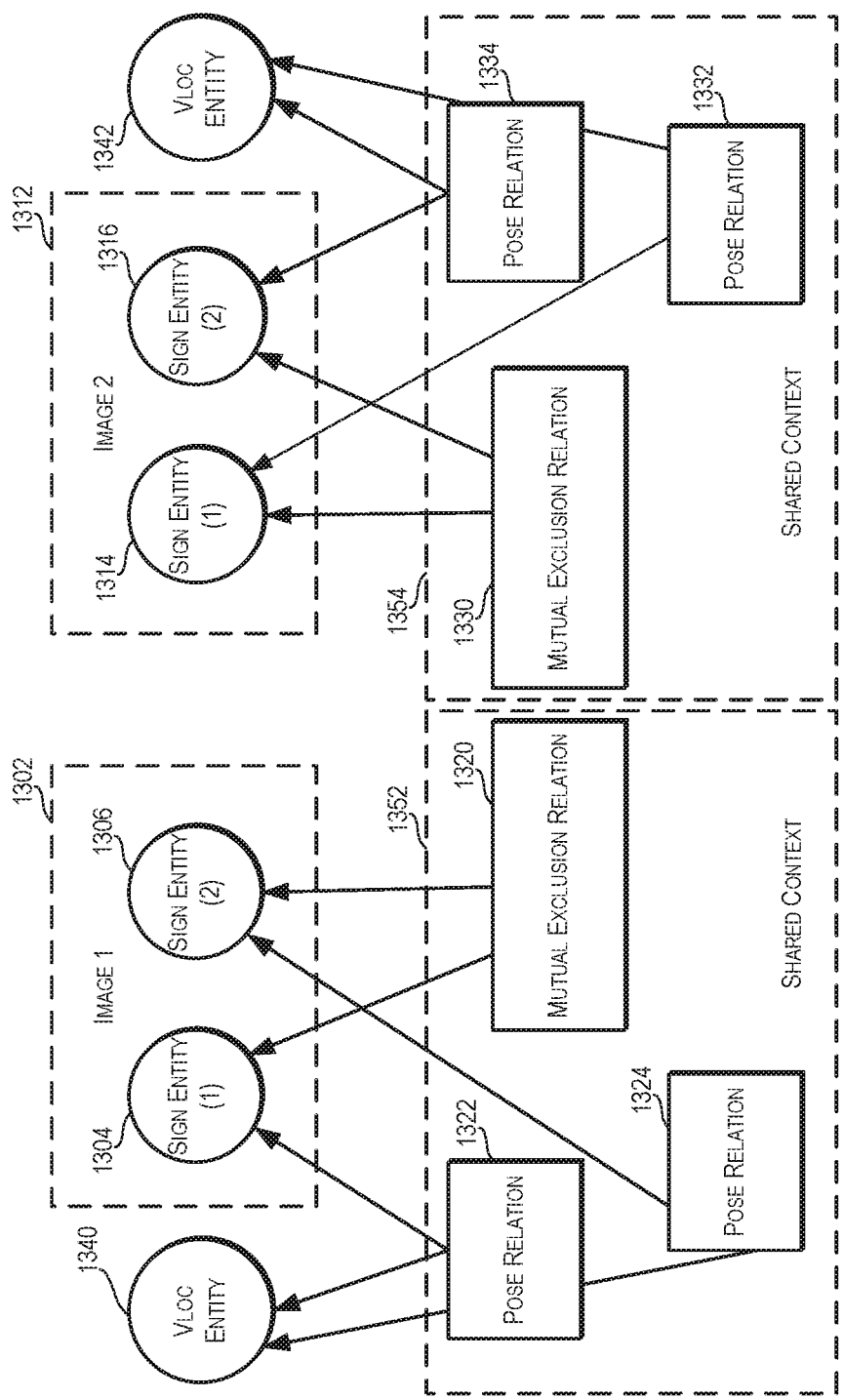
FIG. 13 depicts a block diagram of example vehicle map service data including entities defined based on observations generated from a plurality of images in accordance with example embodiments of the present disclosure.

A further example is depicted in FIG. 13 which illustrates a block diagram of example vehicle map service data including a vehicle map model and uncertainty model in accordance with example embodiments of the present disclosure. In FIG. 13, entities are defined based on observations generated from a plurality of images in accordance with example embodiments of the present disclosure. Two observations of two signs may be made from two different images, each taken from a different vehicle location. An indication can be provided of the constraints on which observations could not be the same, and the pose error envelopes. The vehicle map service can receive sensor data including image data for image 1302 and image 1312. The vehicle map service can generate four sign observations based on the sensor data. The vehicle map service can generate a first sign entity 1304 and a second sign entity 1306 from the first image 1302. Additionally, the vehicle map service can generate a third sign entity 1314 and a fourth sign entity 1316 from the second image 1312. The first sign entity 1304 and the third sign entity 1314 can represent the same actual real world sign. Similarly, the second sign entity 1306 and the fourth sign entity 1316 can represent the same actual real-world sign. The vehicle map service can generate a first vehicle location entity 1340 that indicates a location of the vehicle at the time image 1302 is acquired and a second vehicle location entity 1342 that indicates a location of the vehicle at the time image 1312 is acquired.

The vehicle map service can generate a mutual exclusion relation 1320 that relates sign entity 1304 and sign entity 1306. Because sign entity 1304 and sign entity 1306 are taken from the same image 1302, the mutual exclusion relation can indicate that the sign entities correspond to different real world signs. A first pose relation 1322 defines a pose uncertainty of first sign entity 1304 with respect to a particular pose of the vehicle as a base entity indicated by vehicle location entity 1340. A second pose relation 1324 defines a pose uncertainty of the second sign entity 1306 with respect to a particular pose of the vehicle as a base entity indicated by vehicle location entity 1340. Pose relation 1322, pose relation 1324, and mutual exclusion relation 1320 can include a shared context 1352.

The vehicle map service can generate a mutual exclusion relation 1330 that relates sign entity 1314 and sign entity 1316. Because sign entity 1314 and sign entity 1316 are taken from the same image 1312, the mutual exclusion relation can indicate that the sign entities correspond to different real world signs. A first pose relation 1332 defines a pose uncertainty of third sign entity 1314 with respect to a particular pose of the vehicle as a base entity indicated by vehicle location entity 1342. A second pose relation 1334 defines a pose uncertainty of the fourth sign entity 1316 with respect to a particular pose of the vehicle at a base entity indicated by vehicle location entity 1342. Pose relation 1332, pose relation 1334, and mutual exclusion relation 1330 can include a shared context 1354.

In a variation of the example depicted in FIG. 13, there may also be a module that can determine which entities are the same real-world sign and reflect the clustering of hypotheses on the map, with confidence weights based on the confidence of the original sign entities.

Figure 14:
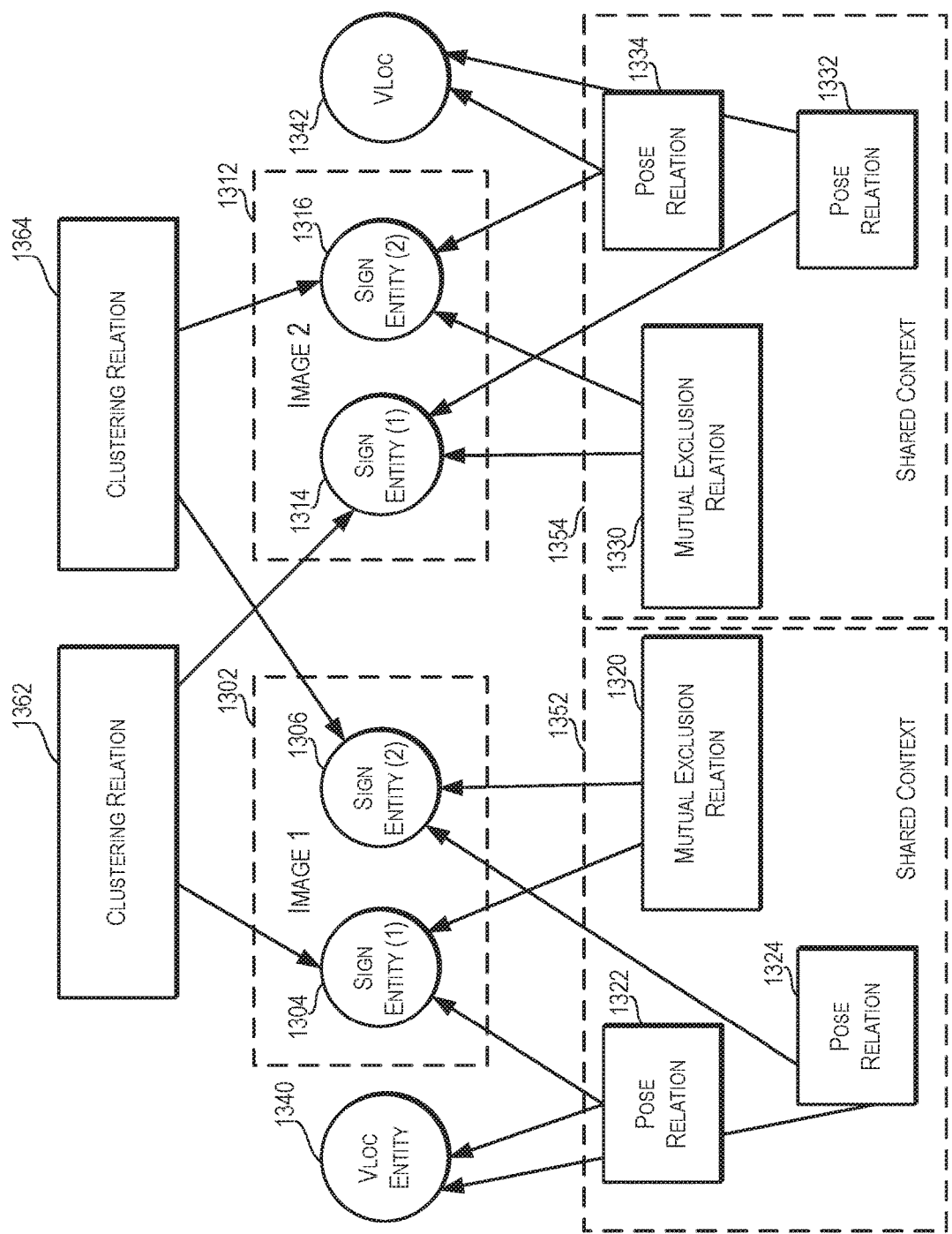
FIG. 14 depicts a block diagram of example vehicle map service data including entities and clustering relations defined between the entities in accordance with example embodiments of the present disclosure.

FIG. 14 depicts a block diagram of example vehicle map service data including a vehicle map model and uncertainty model in accordance with example embodiments of the present disclosure. FIG. 14 depicts a vehicle map model and uncertainty model that is similar to that of FIG. 13, but in addition to the basic models, a separate provider has added two clustering relations that associate observations of the same physical sign.

A first clustering relation 1362 defines a clustering relationship that associates the first sign entity 1304 with the third sign entity 1314. The first clustering relation 1362 may indicate that sign entity 1304 and sign entity 1314 correspond to the same real world sign (1). A second clustering relation 1364 defines a clustering relationship that associates the second sign entity 1306 with the fourth sign entity 1316. The second clustering relation 1364 may indicate that sign entity 1306 and sign entity 1316 correspond to the same real-world sign (2).

By way of further example, consider an example of vehicle location entities that with respect to the earth (e.g., as determined from a GPS sensor) may each have a pose uncertainty envelope. A vehicle location entity object identifier from a vehicle map model can be referenced from a pose relation defined using an uncertainty model. As a further example, consider four hypotheses of a current vehicle position where two hypotheses are on a first road and two other hypotheses are on a different road. Four Kalman filter hypotheses of the current vehicle position may be defined using an uncertainty model.

Figure 15:
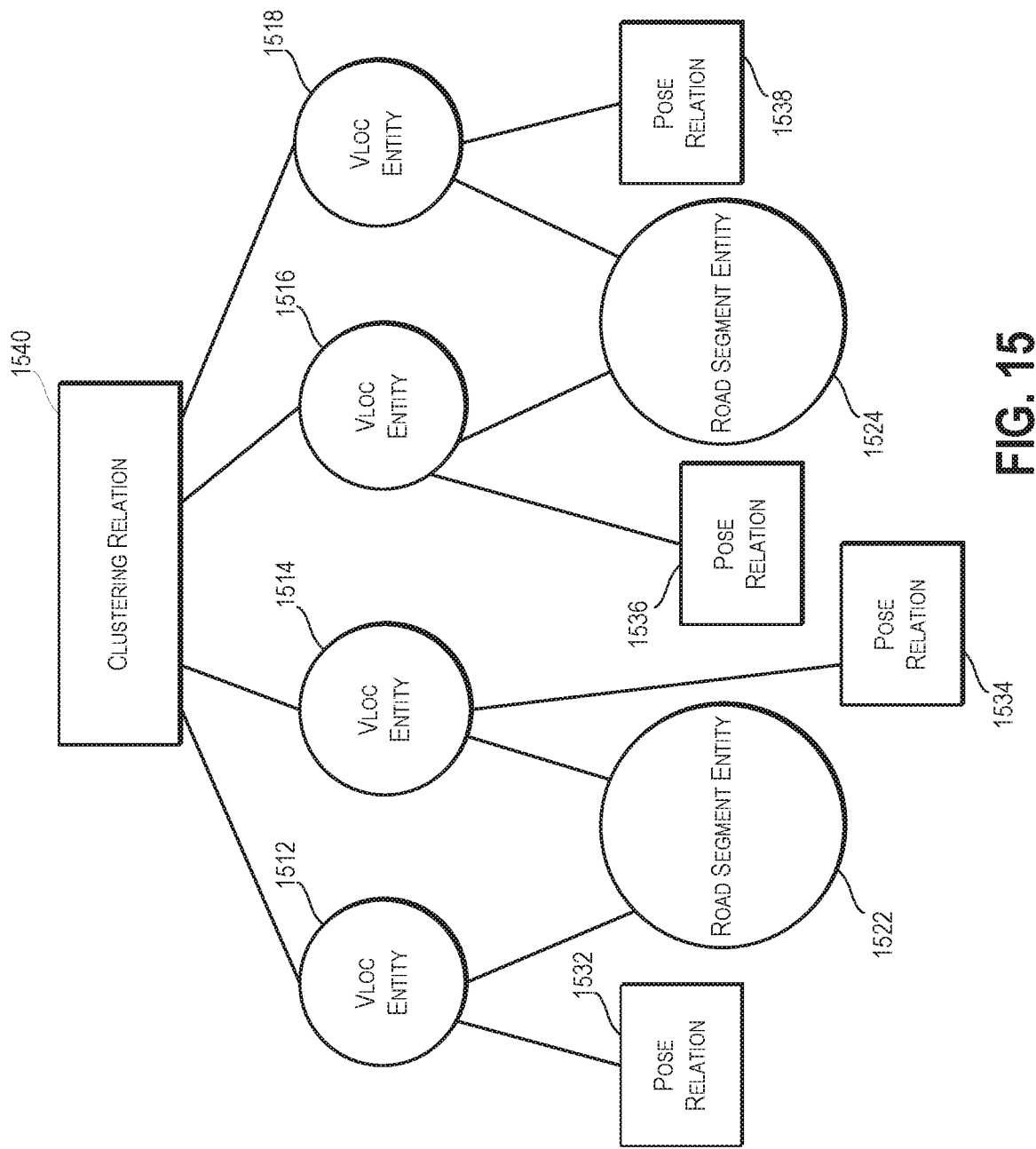
FIG. 15 depicts a block diagram of example vehicle map service data including vehicle location entities and road segment entities in accordance with example embodiments of the present disclosure.

FIG. 15 depicts a block diagram of example vehicle map service data including a vehicle map model and uncertainty model depicting an example of vehicle location entities. For vehicle location entities 1512, 1514, 1516, and 1518 have been defined using a vehicle map model. Two road segment entities 1522 and 1524 have also been defined using the vehicle map model.

Vehicle location entity 1512 has a referencing pose relation 1532 that indicates a pose uncertainty associated with vehicle location entity 1512. Vehicle location entity 1514 has a referencing pose relation 1534 that indicates a pose uncertainty associated with vehicle location entity 1514. Vehicle location entity 1516 has a referencing pose relation 1536 that indicates a pose uncertainty associated with vehicle location entity 1516. Vehicle location entity 1518 has a referencing pose relation 1538 that indicates a pose uncertainty associated with vehicle location entity 1518.

A first road segment entity 1522 matches vehicle location entity 1512 and vehicle location entity 1514 to the same segment entity. A second road segment entity 1524 matches vehicle location entity 1516 and vehicle location entity 1518 to the road same segment entity which is separate from the first road segment entity 1522. Clustering relation 1542 can relate or otherwise associated vehicle location entities 1512, 1514, 1516, and 1518. Clustering relation 1542 can reference each sign and associate a weight with each sign that describes the relative probabilities of that sign being the actual real world sign.

In a further example, two different Kalman filter systems may be used to track the vehicle location. Both sets of hypotheses from the filter systems can be represented in a raw map model. In such an example, the vehicle map model and uncertainty model can double-up the relations illustrated in FIG. 15. Potentially, another meta-cluster relation can be defined that references the two lowest-level cluster relations.

According to some aspects of the present disclosure, the fusion of entities across epochs is provided. In the vehicle mapping service schema, an epoch may be declared by a provider when there is a change in the map. In example embodiments, an epoch may begin an entirely new map, completely independent of the last one, with a new object ID space. For example, entities in the new map may be the same real-world entities in the old map with new object IDs. In the base schema it may not be denoted that an example entity Ia in epoch E is the same real-world entity as example entity Ib in epoch F. In the uncertainty schema, it may be denoted that entities in different epochs are the same entity.

In example embodiments, a clustering relation may be used. The clustering relation may not have a restriction on the form of the object IDs being clustered; they can be from different epochs (e.g. if a provider wants to broadcast the fact that one real-world sign has been on the map in several epochs, they can broadcast an unweighted clustering relation that states that those signs across epochs are the same sign).

In example embodiments, a relation composition may be used. The pose relation may denote uncertainty in a concrete hypothesis. Other relations can be stacked to denote uncertainty in the uncertainty relations themselves. For example, if there are multiple vehicle location cluster relations, each of which comes from a different particle filter model, then if each is represented by a cluster relation, those cluster relations may be related via a cluster relation that gives relative weights to each model, and indicates that the two models are both trying to track hypotheses of the same vehicle.

An example implementation in a vehicle mapping service schema and protocol in accordance with example embodiments of the present disclosure is described. By way of example, three distinct address spaces may be provided for map entities. A first address space may be used for unique entities. The domain for this space may also be the map entity schema, and this space may generally be a subset of the hypothetical entity space. These entities can have references (relations) to other entities in this space. A second address space may be used for hypothetical entities. The domain for this space may also be the map entity schema (e.g. signs, roads, vehicles, etc.). These entities can have references (i.e. relations) to other entities in this or the unique entity space. A third address space may be used for uncertainty relations. The domain for this may be the uncertainty relation schema, and these entities can have references (i.e. relations) to entities in all of the spaces.

In accordance with example embodiments of the present disclosure, mapping these different spaces onto the VMS layer schema may be provided. Unique entities may be those on all of the general map schema layers on a fused sublayer. Hypothetical entities may be those on the general map schema layers in all sublayers, including raw or unfused sublayers. Uncertainty relations can naturally live on their own uncertainty relation layer, which may be: subscribed to by clients who are interested in uncertainty information about the general map layers; and published to or by publishers who wish to share uncertainty models about the map entities that they publish on the fused or unfused map layers.

In example embodiments, some relations may be semantically excluded from some layers by the nature of the layer. For example, a clustering relation may not reference multiple entities on the fused layer, because by definition anything on the fused layer should be the unique hypothesis for a single entity, and thus there should be no cluster of hypotheses associated with it on that layer. A simple pose uncertainty relation could reference fused layer entities, or a cluster of hypothesis could have exactly one reference on the fused layer, but multiple additional hypotheses on other layers.

Example embodiments in accordance with the present disclosure may provide versioning for uncertainty relations. An advantage of having uncertainty relations live on a layer of the vehicle map service schema is that full access is gained to the vehicle map service versioning system. Thus, "version 1.0" of the relation schema may be represented as a major vehicle map service schema version of the relation schema. Adding new relations without disrupting existing relations, or purely adding new properties to an existing relation, may be done via minor versions of the schema (1.1, 1.2). If relations are deprecated, a major versioning of the uncertainty relation schema (version 2.0) may allow the user to start with a "blank slate" for future clients, while still maintaining older client compatibility.

Embodiments in accordance with the present disclosure may allow uncertainty relations to reference target entities. The target entities may all be referenced via vehicle map service object identifiers (ObjectIds). As the relations are themselves vehicle map service entities, relations may reference each other via vehicle map service ObjectIds in a completely uniform way to reference the physical entity hypotheses.

Information related to a context may be stored in different locations and in different manners. Relations can have a context identifier that acts as a grouping mechanism to allow relations to be identified as coming from the same source (e.g. image, instantaneous vehicle pose, etc.). A specific mechanism to provide a description of the context will be described. For example, an image context (e.g., one picture) might have the time the picture was taken or data about the device which took the picture. It may provide uniformity for those entities to have a vehicle map service object identifier, but there may not always be a layer or schema for representing context elements. If a need for this past simply grouping relations by context exists, the schema can be placed in an appropriate location. For example, an Image entity can contain the meta-information about the image context and be broadcast and addressed via an object identifier.

According to some aspects, all relations for an entity may be provided. For example, the vehicle map service can provide a loosely coupled format, where a client may not be sure that it knows about all of the uncertainty relations that reference a particular hypothesized entity. While this problem exists to some extent on other layers, it may be less problematic since, for example, the client can know a priori that there should be exactly one segment connectivity packet and one segment geometry packet associated with a segment, and thus it knows if it has it or not. For uncertainty, there could be any number of relations, or no relations, that reference a particular entity.

Clients may be able to use a meta-layer rebroadcast request for any entity (e.g., using that entity's object ID such as the object ID of a segment etc.). A request to the uncertainty relation layer can cause a rebroadcast of all relations from all providers that reference that entity.

Some examples include a generic map (e.g., a map of layer to object ID) that can be provided in the vehicle map service packet itself that reverse indexes the set of known entities on other layers that reference the entities in this packet. If a particular provider is providing entities that cross-reference each other on various layers, this may allow it to note which full set of entities cross reference which others, and the generic mechanism can be applied to uncertainty relations. It may also allow for an explicit representation of the reverse of other one-to-many mappings like segments to lanes.

In accordance with example embodiments of the present disclosure, a concrete vehicle map service schema is provided. In the layer definitions, there can be a new uncertainty model layer on which uncertainty relations are subscribed to and/or published.

In example embodiments, an extensible uncertainty relation schema may be utilized. Extensibility may be provided by any suitable method. In particular, the vehicle map service schema versioning mechanisms can allow new relations to be added to model specific probability models that are missing in existing relations without upsetting those existing relations. Major versioning also allows removing or drastically modifying older relations if they prove to be poorly formed with respect to future use cases.

In example embodiments, independence from the base entity schema may be incorporated. These uncertainty relations may be extensions to the base unique entity modeling schema; there may not be any fields or modifications to existing entity models, so those models can remain easy to interpret. Clients who are not interested in uncertainty measures may ignore the uncertainty layer entirely, and have a concrete map to work with.

In example embodiments, simplicity and scalability may be incorporated. The relations in a first version may be relatively straightforward and easy to interpret, but the set of relations may be expanded or modified when new use cases arise.

In example embodiments, relative and absolute accuracy may be incorporated. Since all pose relations may be specified with respect to either a global earth frame or the local frame of some entity in the model (including moving vehicle entities), both relative and absolute accuracy may be represented within the same model.

In example embodiments, representation of shared context may be incorporated. Shared context may be expressed as a general concept on uncertainty relations.

In example embodiments, full observation expressibility to third-party services such as geographic information tracking services and other services is provided. The first version pose uncertainty relation may be based on a third-party representation of joint gaussian pose uncertainty. Additionally, or alternatively, the first version pose uncertainty may be based on its relation to the base pose of a vehicle and can be implemented by relating the poses to a specific vehicle location packet at some point in time. The model can also be extended to additional properties modeled in third-party systems (e.g. height, width, etc.) by extending the basic pose uncertainty relation.

Uncertainty relation context may relate to entities that do not currently exist in a vehicle map service schema. For example, if the context is "one image taken by a particular camera", the image may have properties such as position, orientation, etc. However, this camera image entity may not have a place or existence in the vehicle map service schema to point to via the context reference.

In an example of the vehicle map service protocol/schema implementation, a technique is provided that given a basemap entity, a client device may know about all of the uncertainty relations that relate to the entity. Other elements may be modeled as separate parts across layers. Those elements may typically be directly indexed or known a priori (e.g. a segment has exactly one entry on the connectivity, geometry, and property layers; but it is not known if it has 0, 1, or more uncertainty relations associated).

Given the exponentially exploding nature of arbitrary uncertainty relations, it is likely that in some systems there may be a great deal of traffic on the uncertainty layer. For clients that are interested in only very specific types of uncertainty (e.g., pose uncertainty relations on vehicles), they may be exposed to the full layer traffic. In some examples, techniques are provides so that client may not be exposed to the full traffic layer if they choose not to or are unable to process such information.

In order to model a partial observation of an entity, such as an observation of a section of a lane marker without observing the whole thing, a client may be made aware that a concrete linear feature's endpoint is not necessarily the endpoint in real life, and that there may be part of the feature outside the modeled part. This may be considered with regards to linear lane features. The general issue may be of modeling a partial observation of what is effectively an "atomic" feature on the basemap (e.g. a building). In some examples, this can be provided in the entity schema. In other examples, this can be provided in the uncertainty relation schema or in a combination of the schemas. For example, the linear feature can be included with a concrete endpoint, but have an uncertainty relation pointing to it that says it has an unknown continuation of the forward, backward, or both ends.

In accordance with example embodiments of the present disclosure, a general model as described may be useful not only for a vehicle map service, but for other services such as those providing map services. In some examples, "uncertainty relation" can be added as a feature type referencing other concrete features, as well as marking individual features as hypotheses vs. best guesses. Observations can be modeled at scale for return to a remote map service system or vehicle service system. In accordance with example embodiments, a model as described can be adopted in a core schema. In example embodiments, uncertainty relations can be indexed by which entities they reference or what type of relation they are, allowing for efficient access to known relation types by various processing pipelines. For example, if one adds an explicit context reference to the relations, they could also refer back to the particular observation from which the relation was taken.

Figure 16:
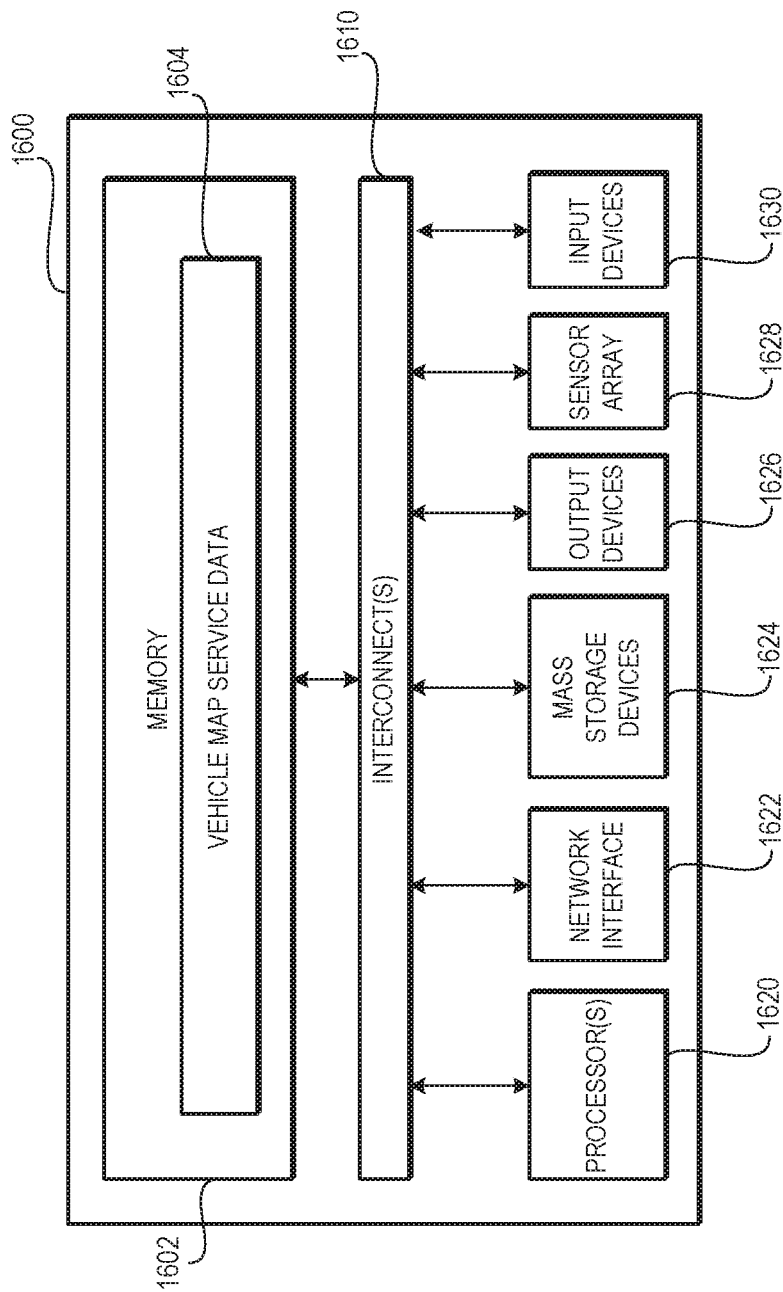
FIG. 16 depicts a block diagram of an example computing device that can be used to implement example embodiments in accordance with the present disclosure.

FIG. 16 depicts a diagram of an example computing device 1600 according to example embodiments of the present disclosure. A vehicle map service device can be implemented using computing device 1600. The vehicle map service device can perform one or more actions and/or operations in accordance with example embodiments.

As shown in FIG. 16, the computing device 1600 can include one or more memory devices 1602, vehicle map service data 1604, one or more interconnects 1632, one or more processors 1620, a network interface, one or more mass storage devices 1624, one or more output devices 1626, a sensor array 1628, and one or more input devices 1630.

The one or more memory devices 1602 can store information and/or data (e.g., the vehicle map service data 1604) including information associated with the processing of one or more instructions that are used to perform one or more actions and/or operations including sending data, receiving data, generating data (e.g., vehicle map service data associated with a local map), and/or determining the state of data.

The vehicle map service data 1604 can include one or more portions of the vehicle map service data 112 used by the vehicle 110 shown in FIG. 1, and by way of further example, can include one or more portions of the vehicle map service data 122 used by the remote map service system 120, and/or can include one or more portions of the vehicle map service data 132 used by the remote vehicle service system 130, also shown in FIG. 1. The vehicle map service data 1604 can include information associated with one or more maps, sensor outputs, and/or machine-learned models.

The one or more interconnects 1610 can include one or more interconnects or buses that can be used to send and/or receive one or more signals (e.g., electronic signals) and/or data (e.g., the vehicle map service data) between components of the computing device 1600, including the one or more memory devices 1602, the one or more processors 1620, the network interface 1622, the one or more mass storage devices 1624, the one or more output devices 1626, the sensor array 1628, and/or the one or more input devices 1630. The one or more interconnects 1610 can be arranged or configured in different ways including as parallel or serial connections. Further the one or more interconnects 1610 can include one or more internal buses to connect the internal components of the computing device 1600; and one or more external buses used to connect the internal components of the computing device 1600 to one or more external devices. By way of example, the one or more interconnects 1610 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, and/or IEEE 1394 interface (FireWire).

The one or more processors 1620 can include one or more computer processors that are configured to execute the one or more instructions stored in the one or more memory devices 1602. For example, the one or more processors 1620 can, for example, include one or more general purpose central processing units (CPUs), application specific integrated circuits (ASICs), and/or one or more graphics processing units (GPUs). Further, the one or more processors 1620 can perform one or more actions and/or operations including one or more actions and/or operations associated with the vehicle map service data 1604. For example, the one or more processors 1620 can include single or multiple core devices including a microprocessor, microcontroller, integrated circuit, and/or logic device.

The network interface 1622 can support network communications. For example, the network interface 1622 can support communication via networks including a local area network and/or a wide area network (e.g., the Internet). The one or more mass storage devices 1624 (e.g., a hard disk drive and/or a solid state drive) can be used to store data including the vehicle map service data 1604. The one or more output devices 1626 can include one or more display devices, one or more loud speakers, and/or one or more haptic output devices.

The one or more memory devices 1602 and the one or more mass storage devices 1624 are illustrated separately, however, the one or more memory devices 1602 and the one or more mass storage devices 1624 can be regions within the same memory module. The vehicle map service device 1600 can include one or more additional processors, memory devices, network interfaces, which may be provided separately or on a same chip or board. The one or more memory devices 1602 and the one or more mass storage devices 1624 can include one or more computer-readable media, including, but not limited to, non-transitory computer-readable media, RAM, ROM, hard drives, flash drives, and/or other memory devices.

The one or more memory devices 1602 can store sets of instructions for applications including an operating system that can be associated with various software applications or data. The one or more memory devices 1602 can be used to operate various applications including a mobile operating system developed specifically for mobile devices. As such, the one or more memory devices 1602 can store instructions that allow the software applications to access data including wireless network parameters (e.g., identity of the wireless network, quality of service), and invoke various services including telephony, location determination (e.g., via global positioning service (GPS) or WLAN), and/or wireless network data call origination services. In other embodiments, the one or more memory devices 1602 can be used to operate or execute a general-purpose operating system that operates on both mobile and stationary devices, such as smartphones and desktop computers, for example.

The software applications that can be operated or executed by the computing device 1600 can include applications associate with the computing environment 100 shown in FIG. 1. Further, the software applications that can be operated or executed by the computing device 1600 can include native applications or web-based applications.

In some embodiments, the computing device 1600 can be associated with or include a positioning system (not shown). The positioning system can include one or more devices or circuitry for determining the position of the computing device 1600. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   one or more processors; and
   one or more non-transitory computer-readable media that collectively store:
   a vehicle map model configured to provide map data for a geographic area in association with a vehicle map service, the vehicle map model having an entity schema comprising a first address space configured to represent a plurality of entities associated with the vehicle map model; and an uncertainty model configured to represent a plurality of uncertainties associated with the plurality, the uncertainty model having an uncertainty schema comprising a second address space that is separate from the first address space;

wherein at least one of the plurality of uncertainties in the second address space is configured to point to one or more of the plurality of entities in the first address space.

2. The computing system of claim 1, wherein the one or more non-transitory computer-readable media collectively store instructions that, when executed by the one or more processors, cause the one or more processors to perform operations, the operations comprising:

obtaining sensor data from one or more sensors of a first vehicle, the sensor data associated with the geographic area; and generating map data based at least in part on the sensor data, wherein generating the map data comprises:

generating, based at least in part on the vehicle map model and the sensor data, a first entity of the plurality of the entities, wherein the first entity is defined in the first address space according to the entity schema of the vehicle map model; and generating, based at least in part on the uncertainty model and the sensor data, one or more uncertainty relations with respect to the first entity, wherein the one or more uncertainty relations are defined in the second address space according to the uncertainty schema of the uncertainty model.

3. The computing system of claim 1, wherein: the plurality of entities includes a plurality of unique entities and a plurality of hypothesized entities.

4. The computing system of claim 3, wherein:
at least one of the plurality of uncertainties in the second address space relates a first unique entity of the plurality of unique entities with a first hypothesized entity of the plurality of hypothesized entities.

5. The computing system of claim 3, wherein:
each of the plurality of unique entities is guaranteed to be unique among the plurality of unique entities; and
each of the plurality of hypothesized entities can lack uniqueness among the plurality of unique entities and the plurality of hypothesized entities.

6. The computing system of claim 3, wherein:
the uncertainty schema is configured to point to unique entities in the first address space and hypothesized entities in the first address space.

7. The computing system of claim 3, wherein:
the first address space includes a unique entity address space corresponding to the plurality of unique entities and a hypothesized entity address space corresponding to the plurality of hypothesized entities.

8. The computing system of claim 3, wherein:
the plurality of hypothesized entities includes a first hypothesized entity and a second hypothesized entity; and
the uncertainty model includes one or more uncertainty relations that model one or more joint existence relations between the first hypothesized entity and the second hypothesized entity.

9. The computing system of claim 3, wherein:
the uncertainty schema comprises a clustering relation configured to reference two or more hypothesized entities that are taken to be a same real-world entity.

10. The computing system of claim 9, wherein:
the clustering relation includes a respective weight for each of the two or more hypothesized entities.

11. The computing system of claim 3, wherein:
the uncertainty schema comprises a mutual exclusion relation configured to reference two or more hypothesized entities that are not a same real-world entity.

12. The computing system of claim 1, wherein:
the entity schema includes a plurality of properties associated with at least one entity of the plurality of entities; and the uncertainty schema includes one or more uncertainty relations that point to one or more of the plurality of properties of the at least one entity to describe one or more error functions on or between the one or more of the plurality of properties associated with the at least one entity.

13. The computing system of claim 1, wherein:
the plurality of entities includes a first entity and a second entity; and
the uncertainty model includes one or more uncertainty relations that associate one or more properties of the first entity with one or more properties of the second entity.

14. The computing system of claim 1, wherein:
the uncertainty model includes one or more uncertainty relations associated with at least one entity of the plurality of entities;
the one or more uncertainty relations include a context; and the context of the one or more uncertainty relations includes a unique address space that attaches to the one or more uncertainty relations to indicate a source of the one or more uncertainty relations.

15. The computing system of claim 1, wherein:
at least one of the plurality of uncertainties in the second address space relates two or more of the plurality of entities in the first address space.

16. The computing system of claim 1, wherein:
the uncertainty schema comprises a pose relation;
the pose relation includes a reference to at least a first entity of the plurality of entities as a base entity; and the pose relation includes a reference to at least a second entity of the plurality of entities as a relative entity whose pose is uncertain relative to the base entity.

17. The computing system of claim 16, wherein:
the pose relation is a first pose relation and the base entity is a first base entity; the uncertainty schema comprises a second pose relation;
the second pose relation includes a reference to at least a third entity of the plurality of entities as a second base entity; and
the pose relation includes a reference to at least the second entity of the plurality of entities as the relative entity whose pose is uncertain relative to the second base entity.

18. The computing system of claim 17, wherein:
the pose relation includes a velocity model of a velocity vector or velocity tensor of the relative entity with respect to the base entity.

19. A computer-implemented method of operating a vehicle map service, the method comprising:
accessing, by one or more computing devices, a map model configured to provide map data for a geographic area in association with a mapping service, the map model comprising a first address space configured to represent entities associated with the map model;

accessing, by the one or more computing devices, an uncertainty model configured to represent a plurality of uncertainties associated with the map data for the geographic area, the uncertainty model comprising a second address space that is separate from the first address space; and generating, by the one or more computing devices, map data comprising information associated with a geographic area, wherein generating the map data comprising information associated with the geographic area comprises generating, based at least in part on the map model, a plurality of entities defined in the first address space according to an entity schema of the map model; and generating, based at least in part on the uncertainty model, one or more uncertainty relations with respect to one or more of the plurality of entities, wherein the one or more uncertainty relations are defined in the second address space according to an uncertainty schema of the uncertainty model.

20. One or more non-transitory computer-readable media that store instructions that, when executed by one or more processors, cause the one or more processors to perform operations, the operations comprising:

accessing, by one or more computing devices, a map model configured to provide map data for a geographic area in association with a mapping service, the map model comprising a first address space configured to represent entities associated with the map model;

accessing, by the one or more computing devices, an uncertainty model configured to represent a plurality of uncertainties associated with the map data for the geographic area, the uncertainty model comprising a second address space that is separate from the first address space; and generating, by the one or more computing devices, map data comprising information associated with a geographic area, wherein generating the map data comprising information associated with the geographic area comprises generating, based at least in part on the map model, a plurality of entities defined in the first address space according to an entity schema of the map model; and generating, based at least in part on the uncertainty model, one or more uncertainty relations with respect to one or more of the plurality of entities, wherein the one or more uncertainty relations are defined in the second address space according to an uncertainty schema of the uncertainty model.

* * * * *